United States Patent
Iwasawa et al.

(10) Patent No.: US 7,180,542 B2
(45) Date of Patent: Feb. 20, 2007

(54) IMAGING LENS DEVICE AND DIGITAL CAMERA HAVING THE IMAGING LENS DEVICE

(75) Inventors: Yoshito Iwasawa, Setagaya-Ku (JP); Kazuaki Matsui, Osaka (JP); Yoshihiro Hara, Kishiwada (JP); Akira Kosaka, Yao (JP); Sadanobu Ueda, Osaka (JP); Satoshi Yokota, Toyonaka (JP)

(73) Assignee: Minolta Co., Ltd., Osaka (JP)

( * ) Notice: Subject to any disclaimer, the term of this patent is extended or adjusted under 35 U.S.C. 154(b) by 657 days.

(21) Appl. No.: 10/391,359

(22) Filed: Mar. 18, 2003

(65) Prior Publication Data
US 2004/0095503 A1    May 20, 2004

(30) Foreign Application Priority Data
Nov. 20, 2002   (JP)   ............................. 2002-336879

(51) Int. Cl.
*H04N 5/262* (2006.01)
(52) U.S. Cl. ................. 348/240.3; 348/340; 348/373; 348/374; 359/354; 359/372; 359/684; 359/687; 359/730; 359/746
(58) Field of Classification Search ............. 348/240.3, 348/340, 373, 374, 376; 359/354, 372, 403, 359/419, 676, 684, 687, 730, 746, 850, 857; 396/447
See application file for complete search history.

(56) References Cited

U.S. PATENT DOCUMENTS

| | | | | |
|---|---|---|---|---|
| 4,114,171 A | * | 9/1978 | Altman ........................ 396/351 |
| 4,249,798 A | * | 2/1981 | Moskovich .................. 359/683 |
| 5,305,148 A | * | 4/1994 | Ikemori et al. ............. 359/689 |
| 5,448,319 A | | 9/1995 | Uzawa .......................... 354/81 |
| 5,583,697 A | * | 12/1996 | Mukaiya ..................... 359/687 |
| 5,706,051 A | * | 1/1998 | Mogamiya .................. 348/337 |

(Continued)

FOREIGN PATENT DOCUMENTS

EP   0 906 587 B1   9/2002

(Continued)

OTHER PUBLICATIONS

Notification of Rejection dated Mar. 3, 2006, issued by the Japanese Patent Office for Counterpart Japanese Application No. 2002-336879, together with an English-language translation thereof.

*Primary Examiner*—Vivek Srivastava
*Assistant Examiner*—Chriss S. Yoder
(74) *Attorney, Agent, or Firm*—Sidley Austin LLP

(57) ABSTRACT

Imaging lens device has a zoom lens system and an image sensor. The zoom lens system has a first reflecting surface, a first movable lens unit, an aperture stop, a second reflecting surface, a second movable lens unit. A first reflecting surface bends a first optical axis which is an incident optical axis of the zoom lens system 90 degrees into a second optical axis. A second reflecting surface bends the second optical axis 90 degrees into a third optical axis. The first optical axis, the second optical axis and the third optical axis are mutually perpendicular. The first movable lens unit and the aperture stop are disposed on the second optical axis. The second movable lens unit is disposed on the third optical axis. During zooming, the first and second reflecting surfaces and the aperture stop are stationary; the first and second movable lens units are moved, respectively.

32 Claims, 14 Drawing Sheets

U.S. PATENT DOCUMENTS

| | | | |
|---|---|---|---|
| 6,016,228 A * | 1/2000 | Uzawa | 359/687 |
| 6,104,432 A * | 8/2000 | Nakamura et al. | 348/360 |
| 6,104,537 A * | 8/2000 | Togino | 359/629 |
| 6,498,624 B1 * | 12/2002 | Ogura et al. | 348/335 |
| 6,538,699 B1 * | 3/2003 | Kosako | 348/341 |
| 6,542,316 B2 * | 4/2003 | Yoneyama | 359/749 |
| 6,718,132 B2 * | 4/2004 | Nishina | 396/72 |
| 6,829,011 B1 * | 12/2004 | Higuchi et al. | 348/340 |
| 6,850,279 B1 * | 2/2005 | Scherling | 348/335 |
| 6,970,201 B1 * | 11/2005 | Neil | 348/335 |
| 2002/0060855 A1 * | 5/2002 | Ohashi | 359/684 |
| 2003/0202258 A1 * | 10/2003 | Hozumi et al. | 359/687 |

FOREIGN PATENT DOCUMENTS

| | | |
|---|---|---|
| JP | 50-44142 S | 5/1975 |
| JP | 02-058038 A | 2/1990 |
| JP | 07-333505 A | 12/1995 |
| JP | 08-029870 A | 2/1996 |
| JP | 08-248318 A | 9/1996 |
| JP | 11-196303 A | 7/1999 |
| JP | 11-258678 A | 9/1999 |
| JP | 2000-131610 A | 5/2000 |
| JP | 2002-169088 A | 6/2002 |

* cited by examiner

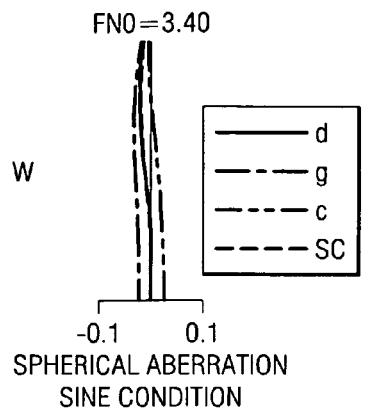
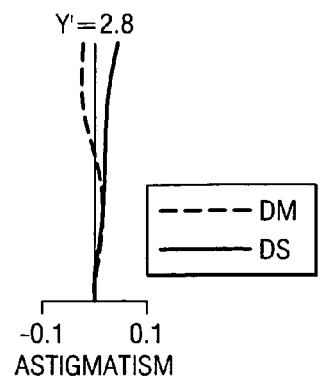
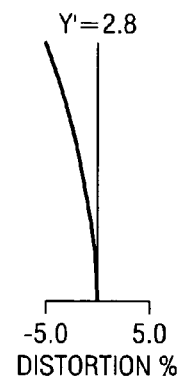
*FIG. 6A*    *FIG. 6B*    *FIG. 6C*
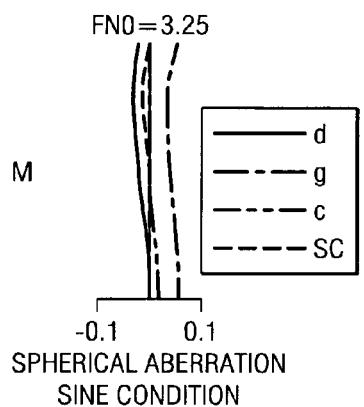
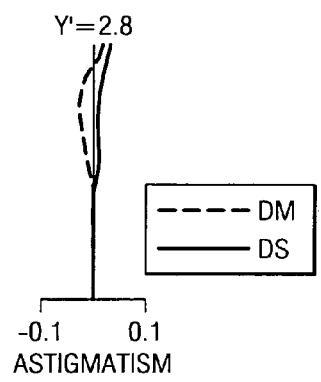
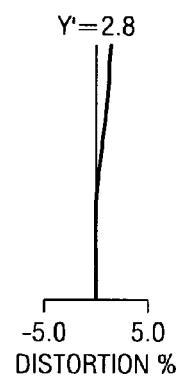
*FIG. 6D*    *FIG. 6E*    *FIG. 6F*
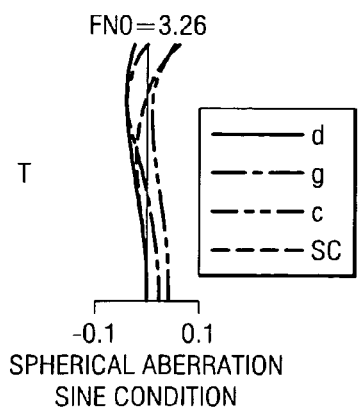
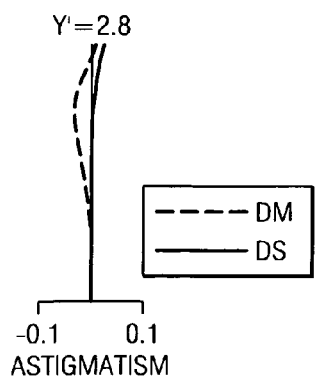
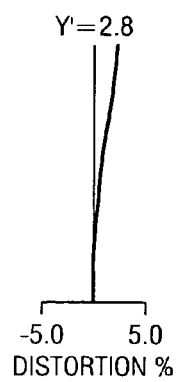
*FIG. 6G*    *FIG. 6H*    *FIG. 6I*

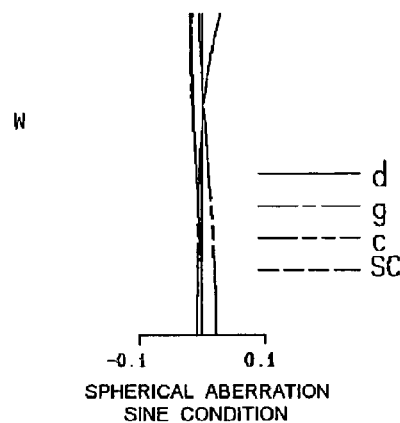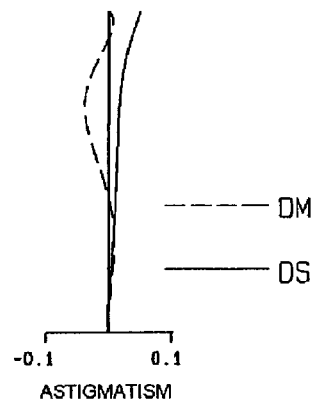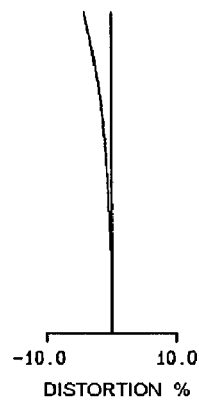
FIG. 9A  FIG. 9B  FIG. 9C
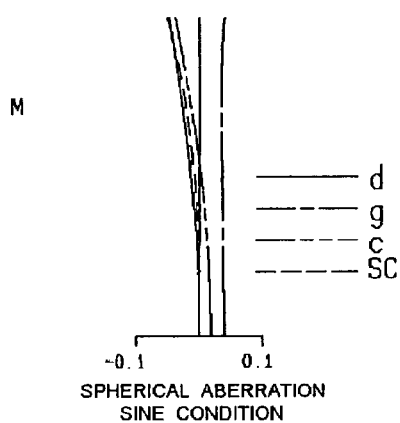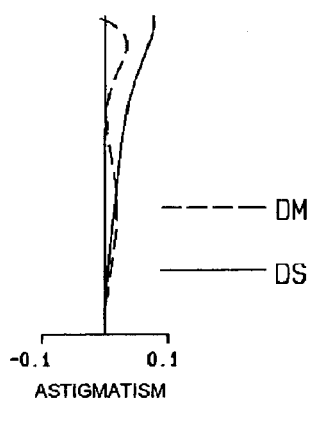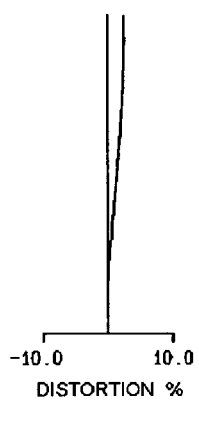
FIG. 9D  FIG. 9E  FIG. 9F
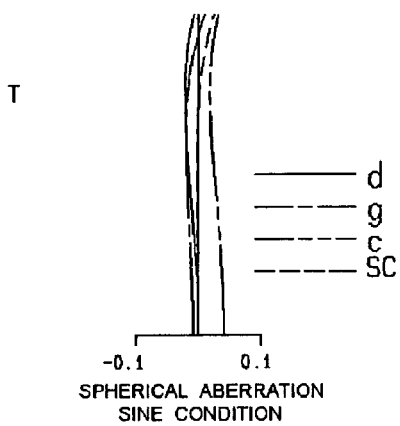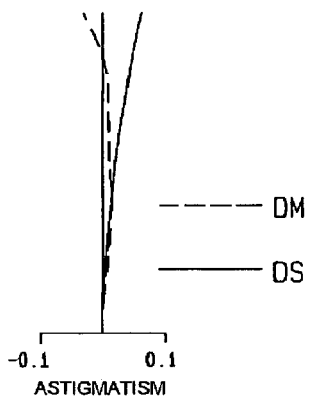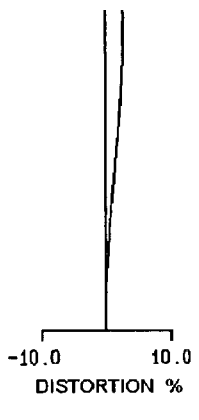
FIG. 9G  FIG. 9H  FIG. 9I

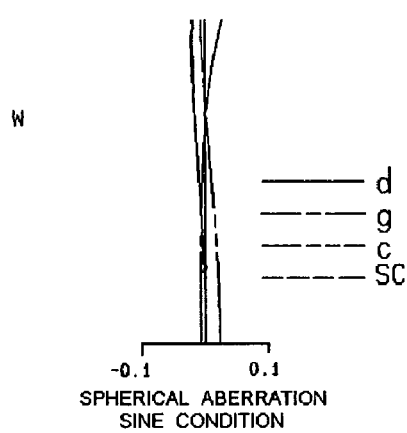
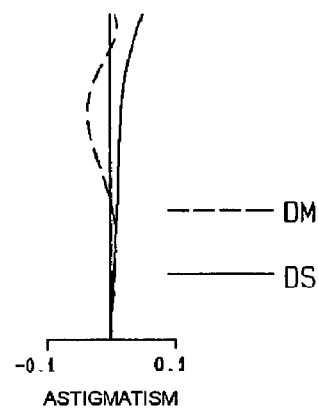
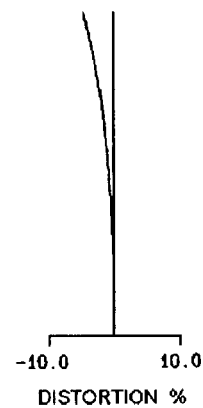
FIG. 13A  FIG. 13B  FIG. 13C
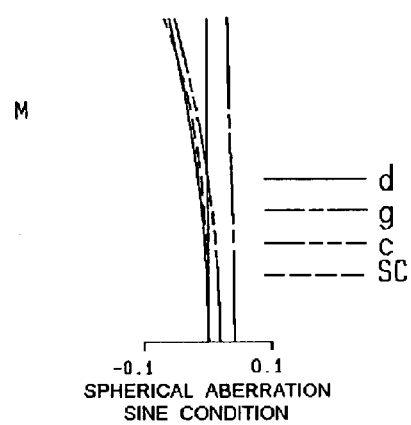
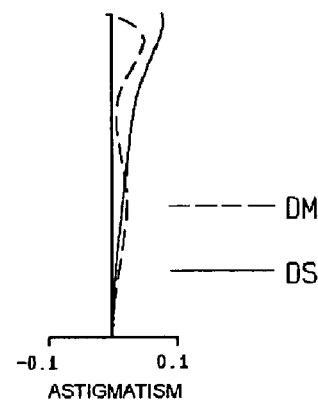
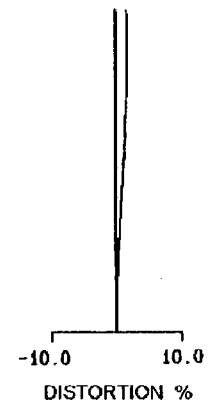
FIG. 13D  FIG. 13E  FIG. 13F
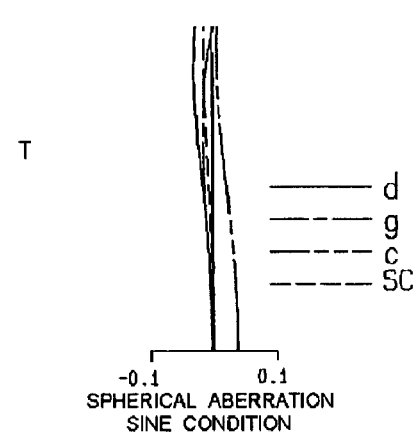
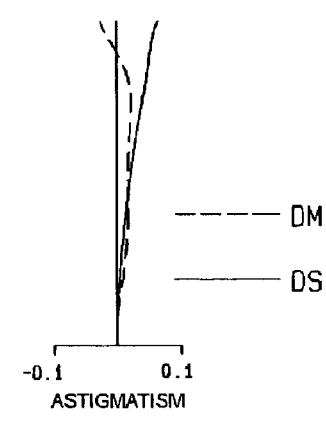
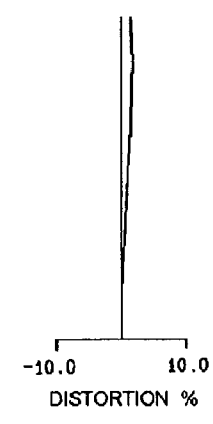
FIG. 13G  FIG. 13H  FIG. 13I

IMAGING LENS DEVICE AND DIGITAL CAMERA HAVING THE IMAGING LENS DEVICE

This application is based on the application No. 2002-336879 filed in Japan Nov. 20, 2002, the entire content of which is hereby incorporated by reference.

BACKGROUND OF THE INVENTION

1. Field of the Invention

The present invention relates to an imaging lens device. More specifically, the present invention relates to an imaging lens device provided with a compact and high-zoom-magnification zoom lens system suitable for digital input and output apparatuses such as digital cameras and a cameras incorporated in or externally attached to a personal computer, a mobile computer, a mobile telephone or the like. Moreover, the present invention relates to digital input and output apparatuses having an imaging lens device provided with a compact and high-zoom-magnification zoom lens system.

2. Description of the Related Art

In recent years, with the spread of personal computers and the like, digital still cameras, digital video cameras and the like (hereinafter, referred to as digital cameras) capable of easily capturing image information into digital apparatuses have been spreading among private users. It is expected that such digital cameras will more and more spread as image information input apparatuses in the future.

The image quality of a digital camera generally depends on the number of pixels of a solid-state image sensing device such as a CCD (charge coupled device). At present, consumer model digital cameras have as many as more than one million pixels, and their image quality is approaching that of film-based cameras. Since it is desired that these consumer model digital cameras also perform zooming of images, particularly optical zooming that hardly causes image quality degradation, a small-size and high-zoom-magnification digital camera zoom lens system satisfying high image quality has been required in recent years.

For size reduction of imaging devices (imaging optical systems), as disclosed in U.S. Pat. No. 5,448,319, European Patent No. 0906587 and U.S. Pat. No. 6,104,432, the size in the direction of the optical axis of the optical system is further reduced by bending the optical system by inserting a prism or a reflecting mirror between lenses. U.S. Pat. No. 5,448,319 discloses a fixed focal length lens system of which optical axis is bent once for vehicle-mounted monitor cameras. European Patent No. 0906587 discloses a fixed focal length lens system of which optical axis is bent twice. U.S. Pat. No. 6,104,432 discloses a zoom lens system of which optical axis is bent once.

However, in U.S. Pat. No. 5,448,319 and European Patent No. 0906587, although size reduction is attained by bending the optical path, the disclosed optical systems are fixed focal length lens systems and not high-zoom-magnification zoom lens systems satisfying high image quality.

In the optical system disclosed in U.S. Pat. No. 6,104,432, although the size in the direction of the depth is reduced by bending the optical axis of the zoom lens system once, the size in the vertical direction is not reduced. To further reduce the size of this optical system, it is considered to further bend the optical axis. However, it is impossible to further bend the optical axis of this optical system. In a high-zoom-magnification zoom lens system with a magnification of approximately 5x, since the number of lens elements is large and the movement amounts of the movable lens units are large, the overall length is large, so that the camera body on which such a zoom lens system is mounted is increased in size. When the overall length of the optical system is forcibly reduced, the sensitivity to errors increases, so that manufacture errors significantly affect the optical performance. When the overall length of the optical system is reduced by increasing the number of lens units that are movable during zooming, the lens barrel structure is complicated, so that the camera body is increased in size. To bend the optical path for size reduction of a high-image quality and high-zoom-magnification zoom lens system, it is necessary to consider the disposition of the movable lens units and the resultant lens barrel structure.

SUMMARY OF THE INVENTION

An object of the present invention is to provide an improved imaging lens device.

Another object of the present invention is to provide a novel imaging lens device having a zoom lens system which lens device is small in size, is high in zoom magnification and realizes high image quality.

Still another object of the present invention is to provide a digital camera having such an imaging lens device.

The above-mentioned objects are achieved by an imaging lens device having the following structure: an imaging lens device comprises: a zoom lens system for forming an optical image; and an image sensing device for converting the optical image formed by the zoom lens system into electrical signals. The zoom lens system of the imaging lens device comprises from an object side thereof to an image side thereof: a first reflecting surface; a first movable lens unit; a second reflecting surface; and a second movable lens unit. The first reflecting surface bends a first optical axis which is an incident optical axis of the zoom lens system into a second optical axis at an angle of approximately 90 degrees. The first movable lens unit is disposed on the second optical axis. The second reflecting surface bends the second optical axis into a third optical axis. The second movable lens unit is disposed on the third optical axis. During zooming, the first reflecting surface and the second reflecting surface are fixed, and the first movable lens unit and the second movable lens unit are moved, respectively.

Moreover, to achieve the above-mentioned objects, another imaging lens device of the present invention has the following structure: an imaging lens device comprises: a zoom lens system for forming an optical image; and an image sensing device for converting the optical image formed by the zoom lens system into electrical signals. The zoom lens system of the imaging lens device comprises from an object side thereof to an image side thereof: a first reflecting surface; an aperture stop and a second reflecting surface. The first reflecting surface bends a first optical axis which is an incident optical axis of the zoom lens system into a second optical axis at an angle of approximately 90 degrees. The aperture stop is disposed on the second optical axis. The second reflecting surface bends the second optical axis into a third optical axis. During zooming, the first reflecting surface, the aperture stop and the second reflecting surface are fixed. And the following conditional formula is satisfied:

$$0.3 < D2/fw < 3$$

where

D2 represents an axial distance between the aperture stop and the second reflecting surface; and fw represents a focal length of an entirely of the zoom lens system at a wide angle limit.

Moreover, to achieve the above-mentioned objects, a digital camera of the present invention is provided with any of the above-described imaging lens devices. While the term digital camera conventionally refers to one that records optical still images, one that can handle moving images as well and household video cameras have been proposed and presently, no particular distinction is drawn between ones handling still images and ones handling moving images. Therefore, in the description that follows, the term digital camera includes all the cameras such as digital still cameras and digital movie cameras whose principal component is an imaging lens device having an image sensing device that converts the optical image formed on the light receiving surface of the image sensing device into an electric signal.

BRIEF DESCRIPTION OF THE DRAWINGS

These and other objects, advantages and features of the invention will become apparent from the following description thereof taken in conjunction with the preferred embodiments with the reference to the accompanying drawings in which:

FIGS. 6A to 6I are graphic representations of aberrations in infinity shooting condition of the first embodiment (first example);

FIGS. 9A to 9I are graphic representations of aberrations in infinity shooting condition of the fourth embodiment (fourth example);

FIGS. 13A to 13I are graphic representations of aberrations in close-up shooting condition (D=0.67 m) of the fourth embodiment (fourth example)

DETAILED DESCRIPTION OF THE PREFERRED EMBODIMENT

Hereinafter, an imaging lens device embodying the present invention will be described with reference to the drawings. An imaging lens device optically capturing an image of a subject and outputting it as an electric signal is a principal component of cameras used for taking still images and moving images of a subject (for example, digital cameras, video cameras, and cameras incorporated in or externally attached to digital video units, personal computers, mobile computers, portable telephones, personal digital assistants [PDAs] and the like).

Figure 14A:
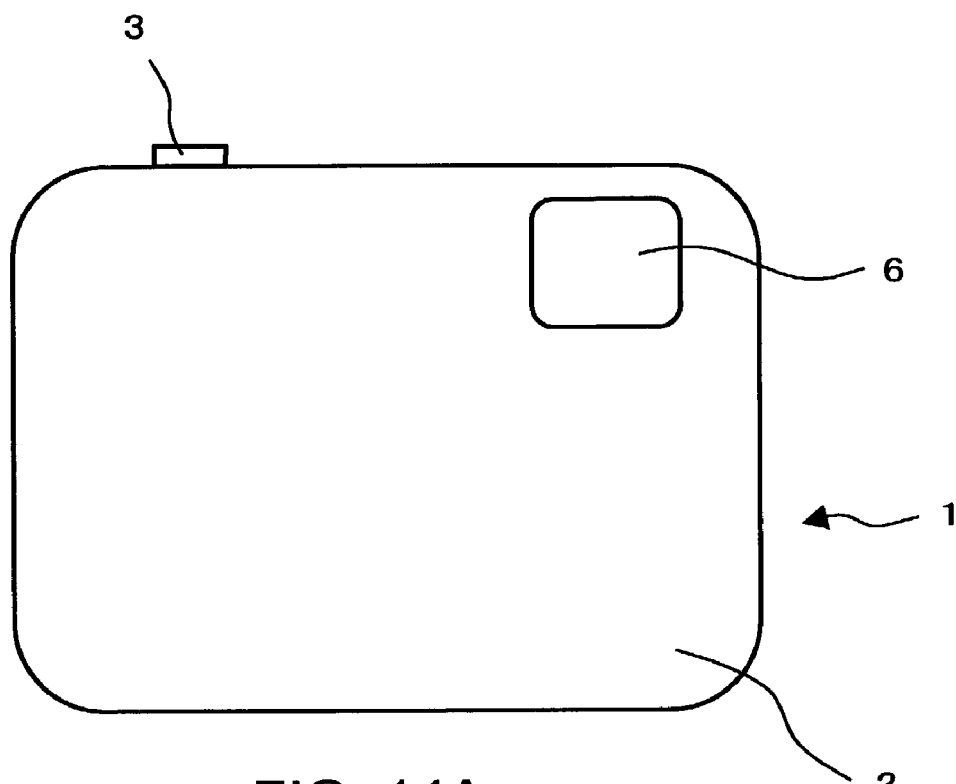
FIGS. 14A and 14B are schematic external views of the digital camera, FIG. 14A being a front view of the digital camera, FIG. 14B being a rear view of the digital camera.
Figure 14B:
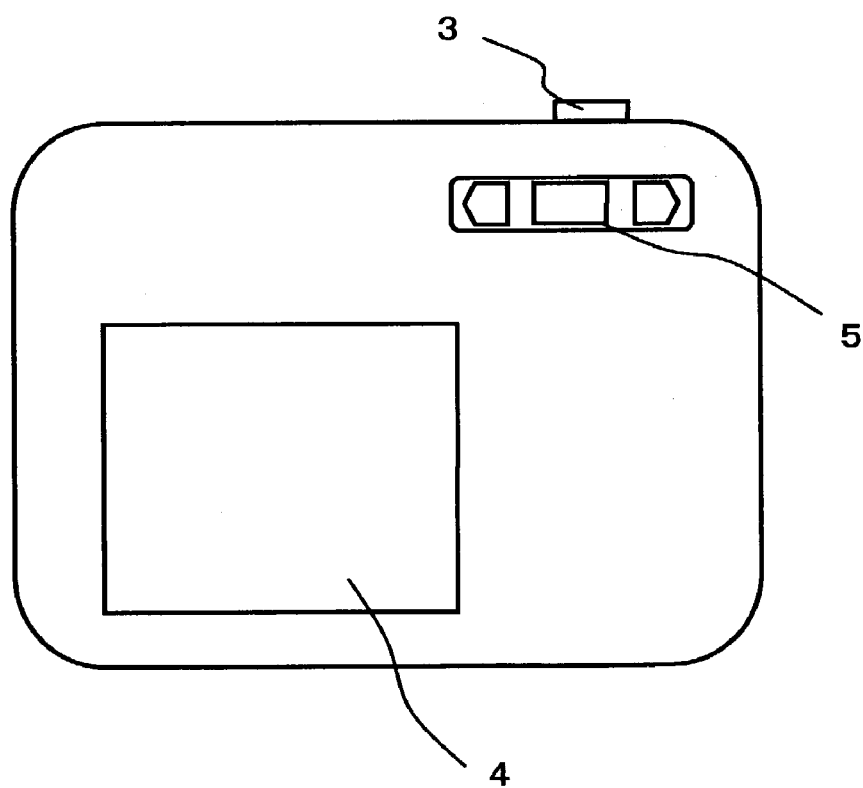

FIGS. 14A and 14B are schematic external views of a digital camera according to the embodiment of the present invention. FIG. 14A is a front view of the digital camera. FIG. 14B is a rear view of the digital camera. In the digital camera 1, an incident lens of an imaging lens device 6 is disposed on the front surface, a release button 3 is disposed on the top surface, and a liquid crystal monitor (LCD) 4 and an operation button 5 are disposed on the rear surface.

Figure 1A:
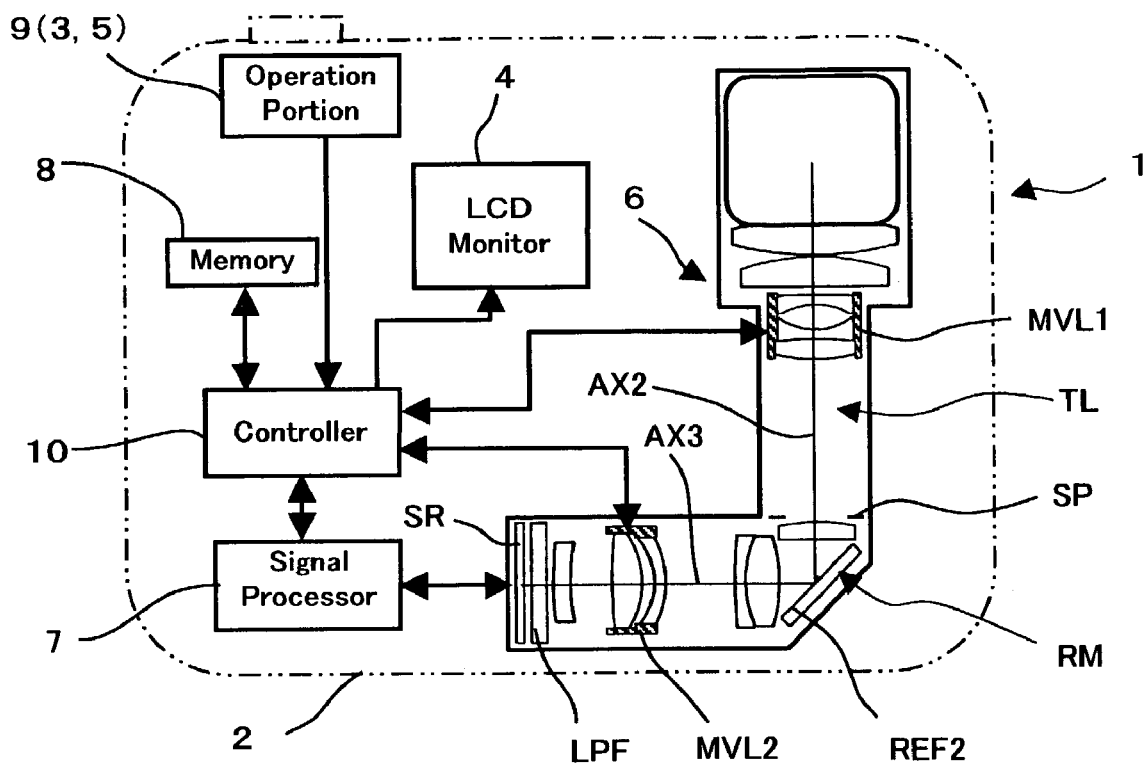
FIGS. 1A and 1B schematically show the internal configuration of a digital camera, FIG. 1A being a view of the digital camera viewed from the front, FIG. 1B being a view of a digital camera viewed from a side.
Figure 1B:
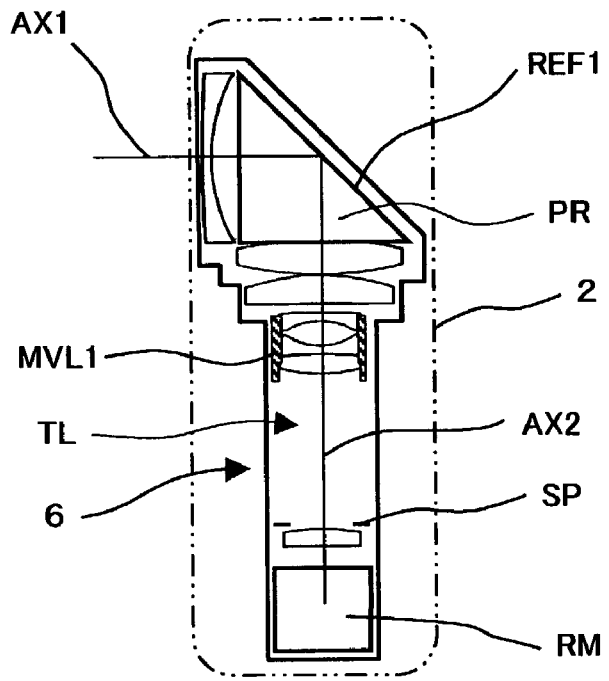

FIGS. 1A and 1B are views schematically showing the internal configuration of the digital camera. FIG. 1A corresponds to a front view of the digital camera 1. FIG. 1B corresponds to a side view of the digital camera 1. The subject (object) is situated on this side of the plane of the figure in FIG. 1A and on the left side of the plane of the figure in FIG. 1B. In FIGS. 1A and 1B, the chain double-dashed lines indicate a housing 2 of the digital camera having the imaging lens device 6. The imaging lens device 6 comprises from the object side: a taking lens system TL forming an optical image of an object; a planeparallel plate LPF corresponding to an optical low pass filter or the like; and an image sensing device SR converting the optical image formed by the taking lens system TL, into an electric signal.

A solid-state image sensing device such as a CCD or a CMOS (complementary metal oxide semiconductor) sensor comprising a plurality of pixels is used as the image sensing device SR. The optical image formed by the taking lens system TL is converted into an electric signal. The spatial frequency characteristic of the optical image to be formed by the taking lens system TL is adjusted so that so-called aliasing noise caused when the optical image is converted into an electric signal is minimized, by the optical image passing through the optical low pass filter LPF having a predetermined cutoff frequency characteristic depending on the pixel pitch of the image sensing device SR.

The signal generated by the image sensing device SR undergoes predetermined analog image processing, analog-digital conversion, digital image processing, image compression and the like at a signal processor 7, and is then recorded onto a memory 8 (a semiconductor memory, an optical disk, etc.) as a digital video signal, or in some cases, transmitted to another apparatus through a cable or after converted into an infrared signal. A controller 10 comprises a microcomputer, and intensively controls the shooting function, the image playback function, the lens moving mechanism for zooming and focusing, or the like. The liquid crystal monitor 4 displays the image signal converted by the image sensing device SR as an image, or displays the image signal recorded on the memory 8 as an image. An operation portion 9 includes various kinds of dials and buttons such as the release button 3 and the operation button 5. Information input by the user's operation is transmitted to the controller 10 through the operation portion 9.

Next, the taking lens system TL will be described with reference to FIGS. 1A and 1B. The taking lens system TL is a zoom lens system. A first optical axis AX1 which is the incident optical axis of the taking lens system TL is bent approximately 90° by a first reflecting surface REF1 of a rectangular prism PR. A first movable lens unit MVL1 and an aperture stop SP are disposed on a second optical axis AX2 which is the optical axis after bent by the first reflecting surface REF1. The second optical axis AX2 is bent approximately 90° in a direction vertical to the first optical axis by a second reflecting surface REF2 of a reflecting mirror RM. A second movable lens unit MVL2 is disposed on a third optical axis AX3 which is the optical axis after bent by the second reflecting surface REF2. The first optical axis AX1, the second optical axis AX2 and the third optical axis AX3 are approximately vertical to one another. During zooming of the taking lens system TL, the rectangular prism PR, the aperture stop SP and the reflecting mirror RM are fixed, the first movable lens unit MVL1 is moved along the second optical axis AX2, and the second movable lens unit MVL2 is moved along the third optical axis AX3. The movements of these movable lens units are controlled by the controller 10.

The above-described imaging lens device 6 enables size reduction and thickness reduction of the digital camera 1. By the first optical axis AX1 being bent approximately 90° and the second optical axis being bent in a direction vertical to the first optical axis, the thickness in the direction of the incident optical axis can be reduced. Moreover, by the second optical axis AX2 being bent, the size can be reduced although the zoom lens system is large in overall length and high in zoom magnification. Although it is not always necessary that the third optical axis AX3 be vertical to the second optical axis AX2 in the taking lens system TL, it is desirable that the plane formed by the second and the third optical axes be vertical to the first optical axis. With this structure, the thickness in the direction of the incident optical axis can be reduced. Moreover, the positional relationship among the optical axes may be such that the first optical axis AX1 and the third optical axis AX3 are parallel to each other and the second optical axis is vertical to the first and the third optical axes. In this case, the width of the digital camera can be reduced.

FIGS. 2 to 5 are lens arrangement diagrams of zoom lens systems of a first to a fourth embodiment of the above-described imaging lens device, each showing the lens arrangement at the wide-angle limit (W) with optical cross-sectional view. In each lens arrangement diagram, an arrow mj (j=1,2, . . . ) schematically shows the movement of j-th lens unit (Grj) during zooming from the wide-angle limit (W) to the telephoto limit (T), and an arrow mF shows the direction of movement of the focusing lens unit during focusing from infinity to a close up distance. Moreover, in each lens arrangement diagram, the surface designated ri (i=1,2,3, . . . ) is the i-th surface counted from the object side, and the surface designated ri marked with asterisks is aspherical surface. The axial distance designated di (i=1,2, 3, . . . ) is, of the i-th axial distance counted from the object side, variable distance that varies during zooming. In the lens arrangement diagrams of FIGS. 2 to 5, for convenience sake, the optical axes are not bent and the lens elements are arranged in a straight line. For this reason, the shape of the rectangular prism PR is not shown. And the reflecting surface REF2 of the reflecting mirror RM is shown as broken line.

The zoom lens systems of the embodiments all comprise from the object side: a first lens unit Gr1 having a positive optical power; a second lens unit Gr2 having a negative optical power; a third lens unit Gr3 having a positive optical power; and a fourth lens unit Gr4 having a positive optical power. During zooming from the wide-angle limit [W] to the telephoto limit [T], the second lens unit Gr2 is moved so as to be always situated on the image side of its position at the wide-angle limit [W], the fourth lens unit is moved so as to correct the image point shift caused by the movement of the second lens unit, and the distances between the lens units are varied, thereby performing zooming.

As the zoom lens system used for a camera (for example, a digital still camera) having a solid-state image sensing device (for example, a CCD), a glass-made planeparallel plate LPF corresponding to an optical low pass filter or the like is disposed on the image side thereof. In all of these embodiments, the first lens unit Gr1 comprises from the object side at least one negative lens element, a rectangular prism PR for bending the optical axis, and two positive lens elements. The optical axis of the most object side negative lens element is the incident optical axis, that is, the first optical axis AX1. A doublet lens element is used in each of the second lens unit Gr2 and the third lens unit Gr3. The lens arrangements of the embodiments will be described below in more detail. The planeparallel plate disposed on the most image side in FIGS. 2 to 5 is the cover glass of the image sensing device SR.

Figure 2:
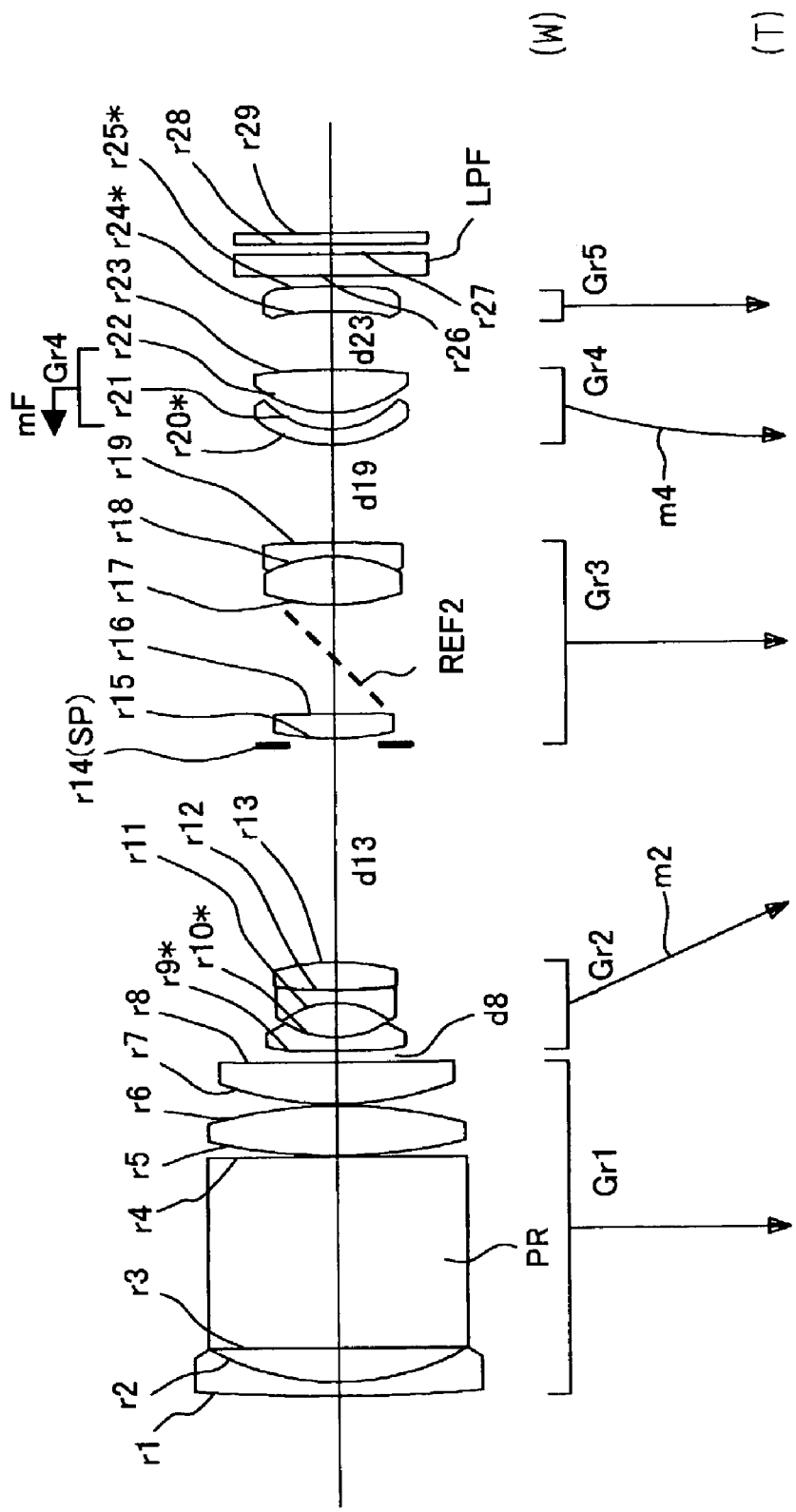
FIG. 2 is a lens arrangement diagram of a first embodiment (first example)

First Embodiment (FIG. 2, Positive, Negative, Positive, Positive, Negative)

The zoom lens system of the first embodiment is a five-unit zoom lens system of positive, negative, positive, positive, negative configuration, and the lens units comprise the following elements from the object side: A first lens unit Gr1 comprises: a negative meniscus lens element concave to the image side; a rectangular prism PR (illustrated as a planeparallel plate in FIG. 2); a bi-convex positive lens element; and a positive meniscus lens element (substantially plano-convex lens element) convex to the object side. A second lens unit Gr2 comprises a negative lens element having an aspherical surface on each surface; and a doublet lens element consisting of a negative lens element and a bi-convex positive lens element. The second lens unit Gr2 is disposed on the second optical axis AX2. A third lens unit Gr3 comprises: an aperture stop SP; a bi-convex positive lens element; the second reflecting surface REF2 of the reflecting mirror RM (illustrated as broken line in FIG. 2); and a doublet lens element consisting of a bi-convex positive lens element and a negative meniscus lens element concave to the object side. A fourth lens unit Gr4 comprises: a negative meniscus lens element convex to the object side and having an aspherical surface on the object side; and a bi-convex positive lens element. The fourth lens unit Gr4 is disposed on the third optical axis AX3. A fifth lens element Gr5 comprises a negative meniscus lens element concave to the object side and having an aspherical surface on each surface.

Figure 3:
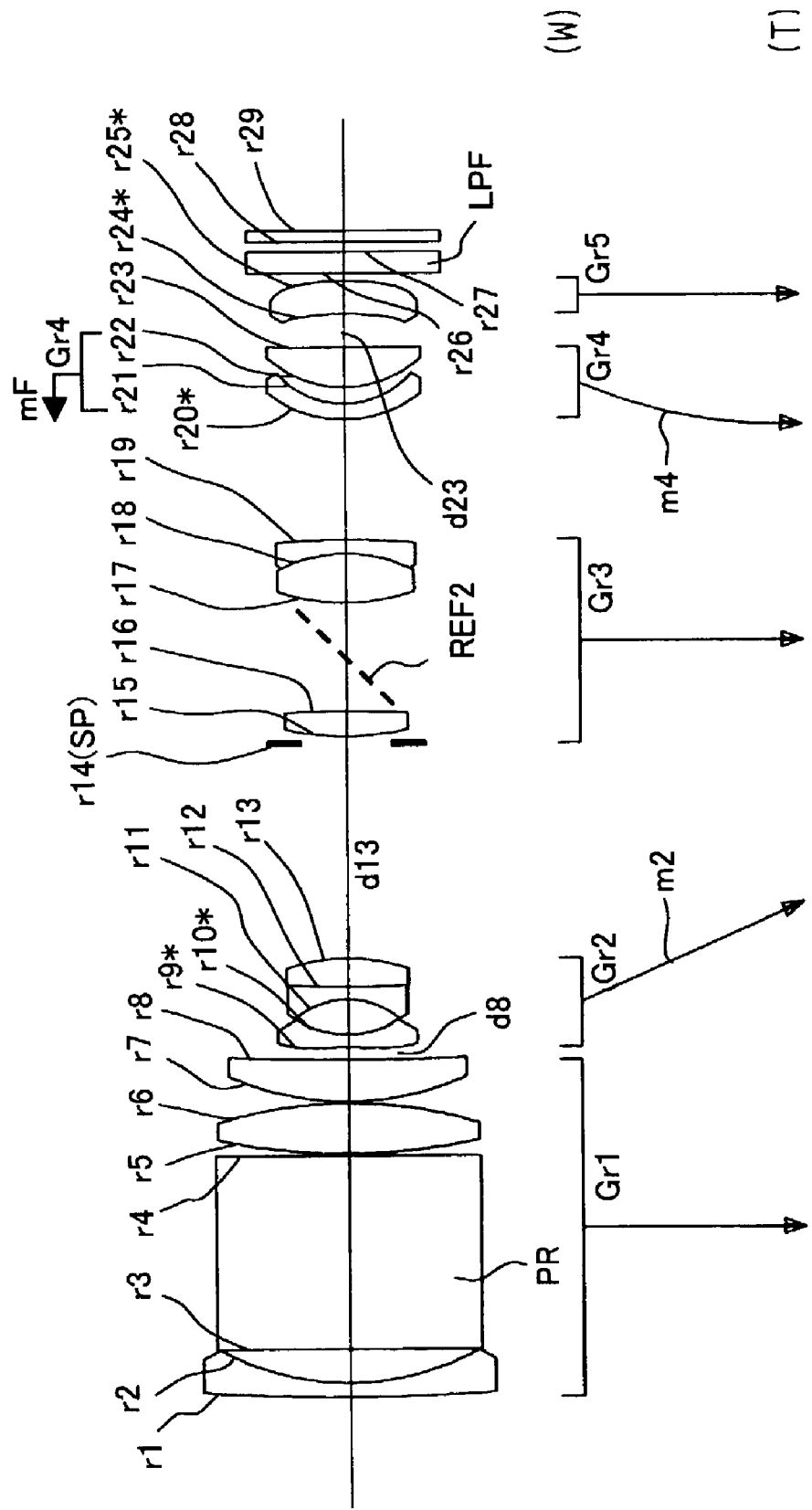
FIG. 3 is a lens arrangement diagram of a second embodiment (second example)

Second Embodiment (FIG. 3, Positive, Negative, Positive, Positive, Positive)

The zoom lens system of the second embodiment is a five-unit zoom lens system of positive, negative, positive, positive, positive configuration, and the lens units comprise the following elements from the object side: A first lens unit Gr1 comprises: a negative meniscus lens element concave to the image side; a rectangular prism PR (illustrated as a planeparallel plate in FIG. 3); a bi-convex positive lens element; and a positive meniscus lens element convex to the object side. A second lens unit Gr2 comprises: a negative lens element having an aspherical surface on each surface;

and a doublet lens element consisting of a biconcave negative lens element and a bi-convex positive lens element. The second lens unit Gr2 is disposed on the second optical axis AX2. A third lens unit Gr3 comprises: an aperture stop SP; a bi-convex positive lens element; the second reflecting surface REF2 of the reflecting mirror RM (illustrated as broken line in FIG. 3); and a doublet lens element consisting of a bi-convex positive lens element and a negative meniscus lens element concave to the object side. A fourth lens unit Gr4 comprises: a negative meniscus lens element convex to the object side and having an aspherical surface on the object side; and a positive meniscus lens element convex to the object side. The fourth lens unit Gr4 is disposed on the third optical axis AX3. A fifth lens element Gr5 comprises a positive meniscus lens element concave to the object side and having an aspherical surface on each surface.

Figure 4:
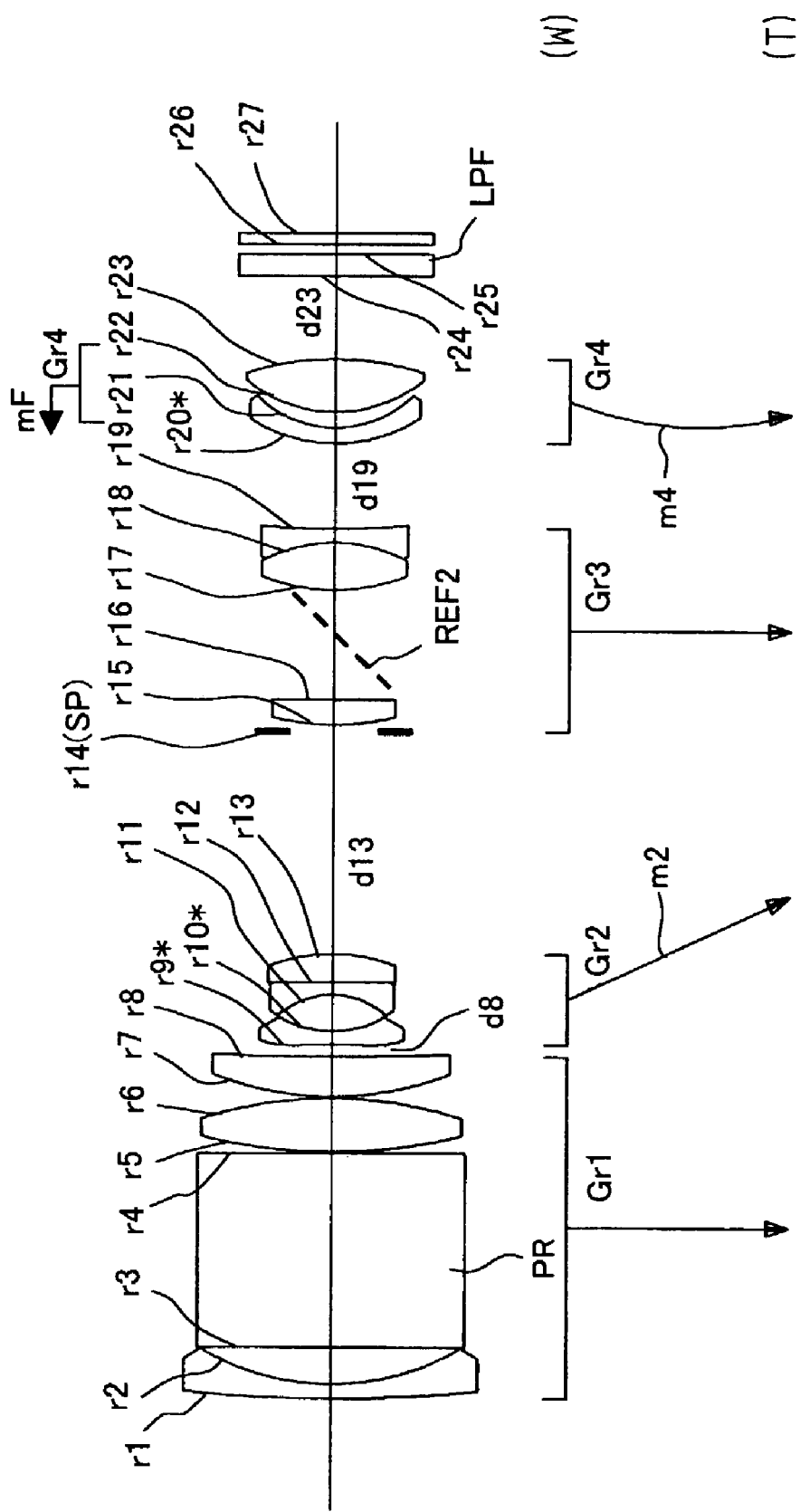
FIG. 4 is a lens arrangement diagram of a third embodiment (third example)

Third Embodiment (FIG. 4, Positive, Negative, Positive, Positive)

The zoom lens system of the third example is a four-unit zoom lens system of positive, negative, positive, positive configuration, and the lens units comprise the following elements from the object side: A first lens unit Gr1 comprises: a negative meniscus lens element concave to the image side; a rectangular prism PR (illustrated as a planeparallel plate in FIG. 4); a bi-convex positive lens element; and a positive meniscus lens element convex to the object side. A second lens unit Gr2 comprises a negative lens element having an aspherical surface on each surface; and a doublet lens element consisting of a negative meniscus lens element concave to the object side and a positive meniscus lens element convex to the image side. The second lens unit Gr2 is disposed on the second optical axis AX2. A third lens unit Gr3 comprises: an aperture stop SP; a positive meniscus lens element (substantially plano-convex lens element) having a convex surface on the object side; the second reflecting surface REF2 of the reflecting mirror RM (illustrated as broken line in FIG. 4); and a doublet lens element consisting of a bi-convex positive lens element and a bi-concave negative lens element. A fourth lens unit Gr4 comprises: a negative meniscus lens element convex to the object side and having an aspherical surface on the object side; and a bi-convex positive lens element. The fourth lens unit Gr4 is disposed on the third optical axis AX3.

Figure 5:
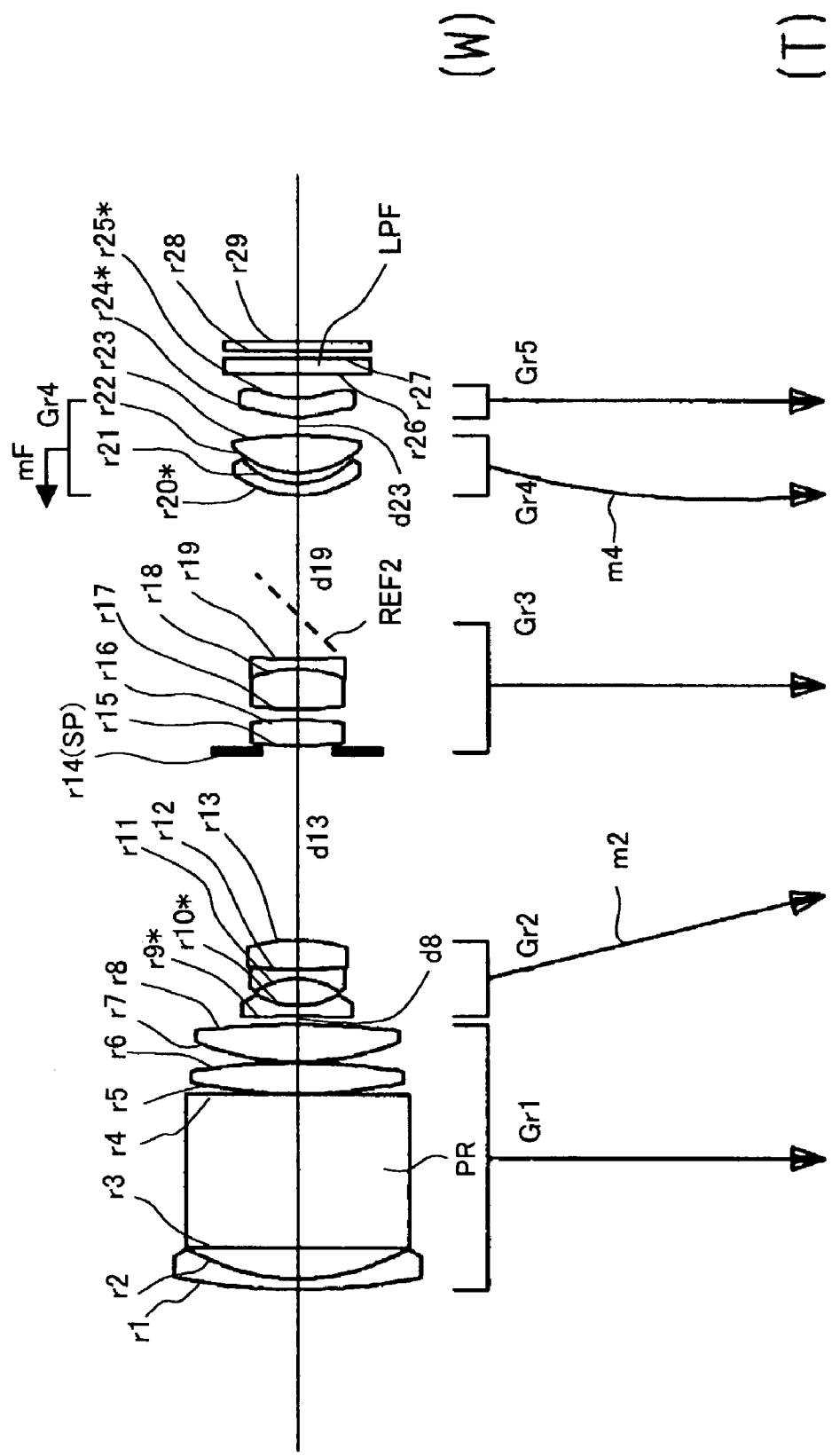
FIG. 5 is a lens arrangement diagram of a fourth embodiment (fourth example)
Figure 7A:
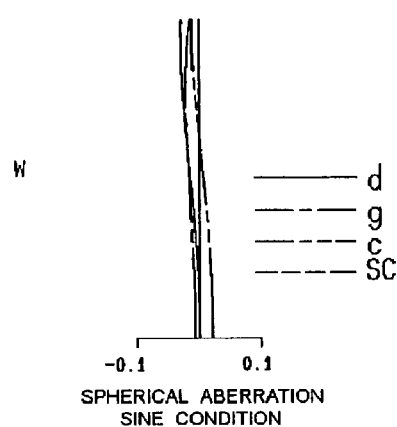
FIGS. 7A to 7I are graphic representations of aberrations in infinity shooting condition of the second embodiment (second example)
Figure 7B:
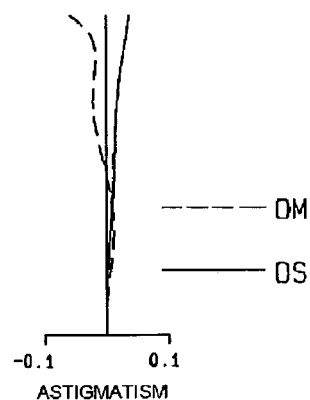
Figure 7C:
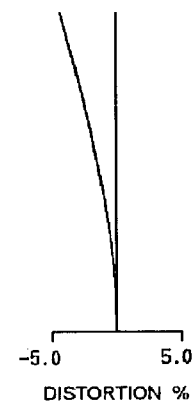
Figure 7D:
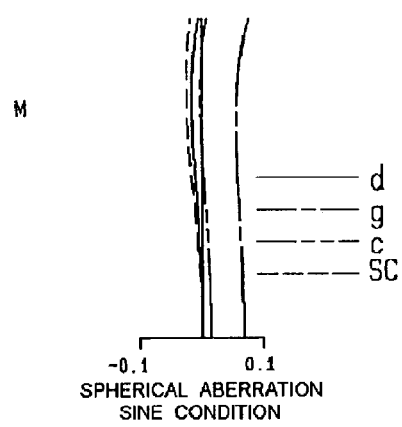
Figure 7E:
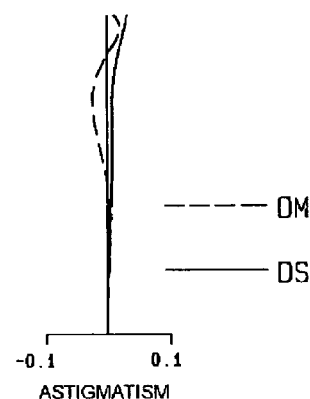
Figure 7F:
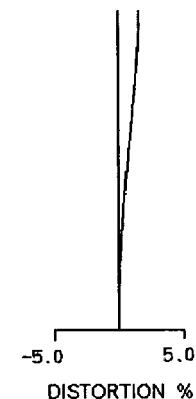
Figure 7G:
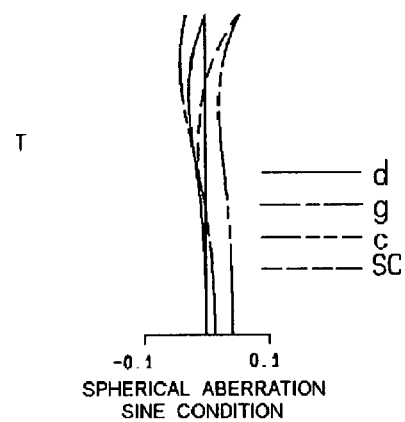
Figure 7H:
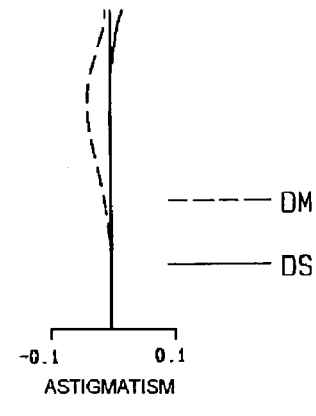
Figure 7I:
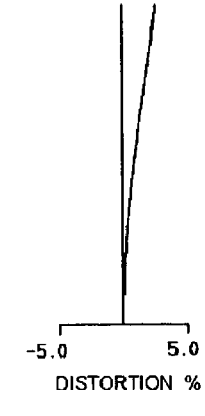
Figure 8A:
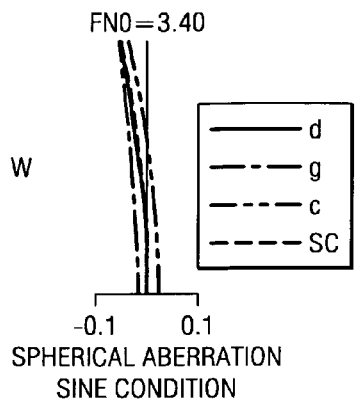
FIGS. 8A to 8I are graphic representations of aberrations in infinity shooting condition of the third embodiment (third example)
Figure 8B:
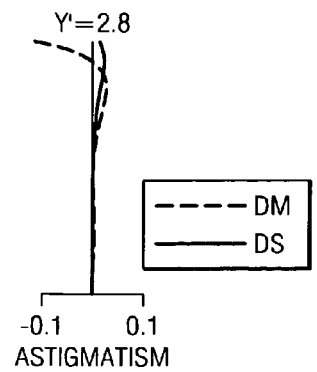
Figure 8C:
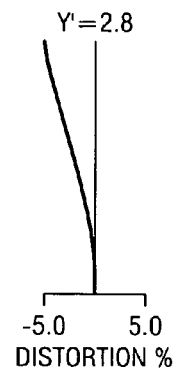
Figure 8D:
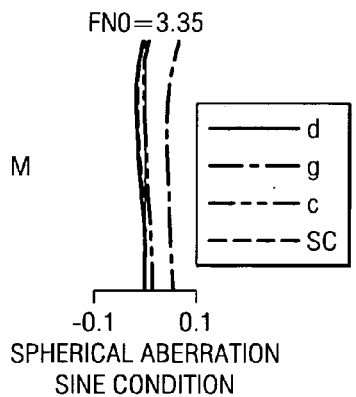
Figure 8E:
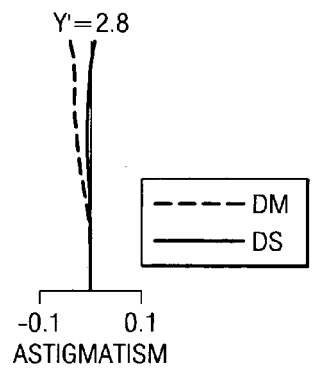
Figure 8F:
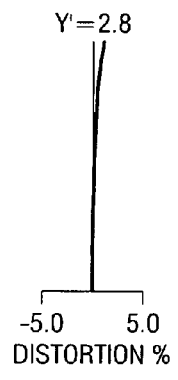
Figure 8G:
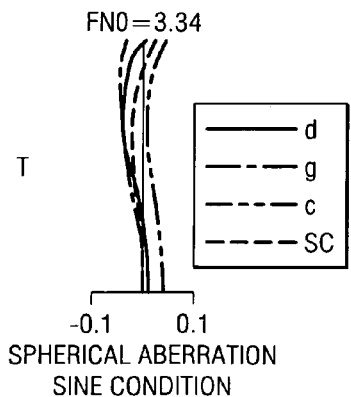
Figure 8H:
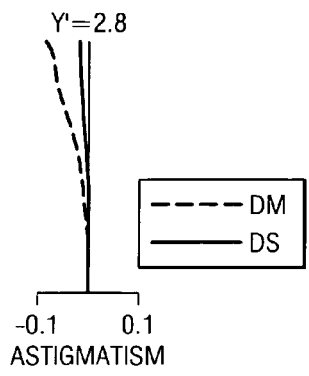
Figure 8I:
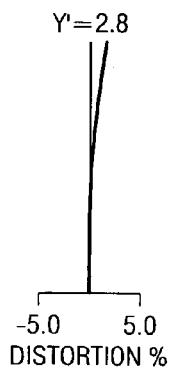
Figure 10A:
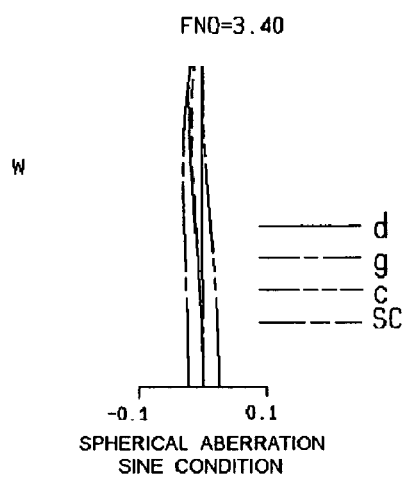
FIGS. 10A to 10I are graphic representations of aberrations in close-up shooting condition (D=0.37 m) of the first embodiment (first example)
Figure 10B:
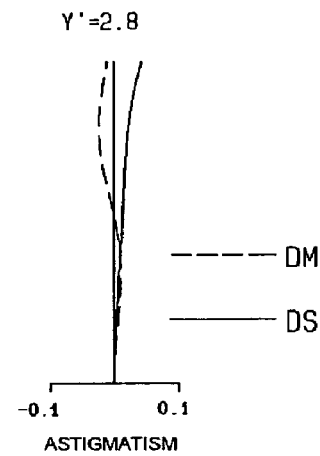
Figure 10C:
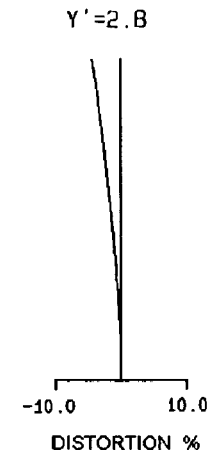
Figure 10D:
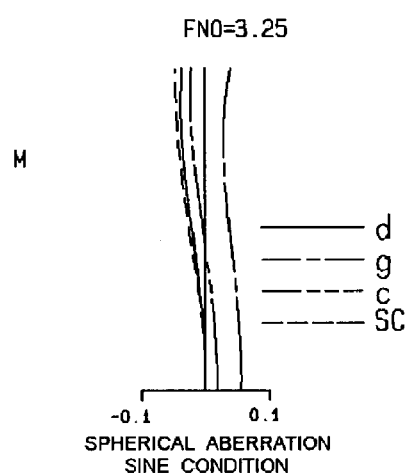
Figure 10E:
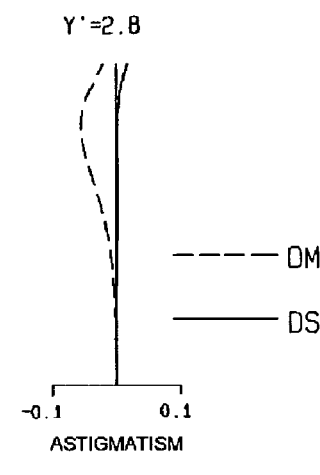
Figure 10F:
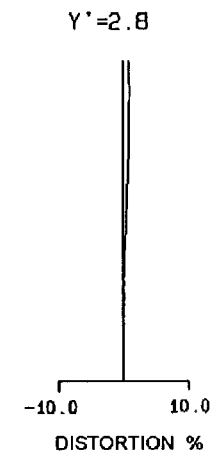
Figure 10G:
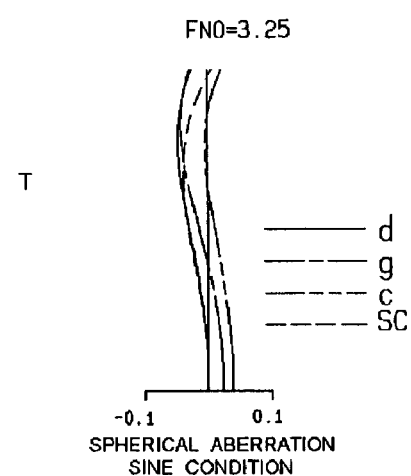
Figure 10H:
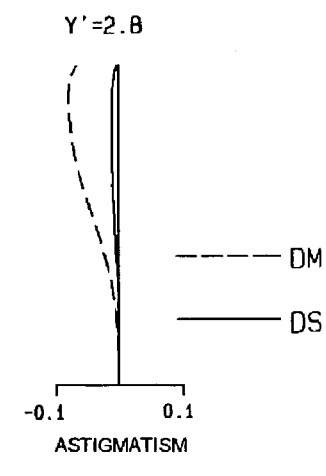
Figure 10I:
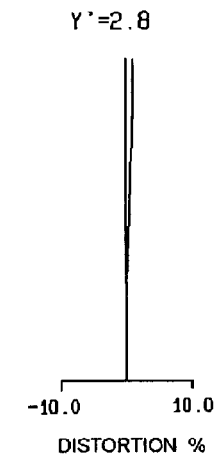
Figures 11A, 11B, 11C:
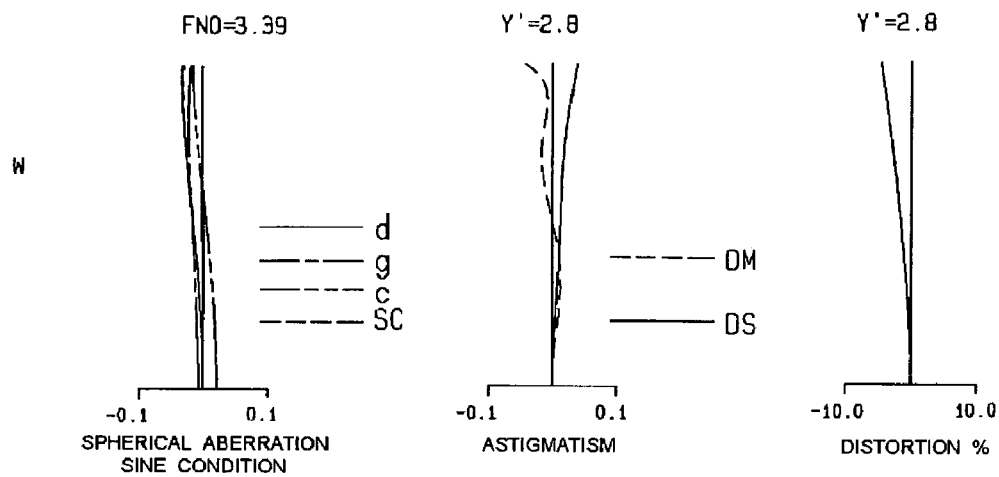
FIGS. 11A to 11I are graphic representations of aberrations in close-up shooting condition (D=0.37 m) of the second embodiment (second example)
Figures 11D, 11E, 11F:
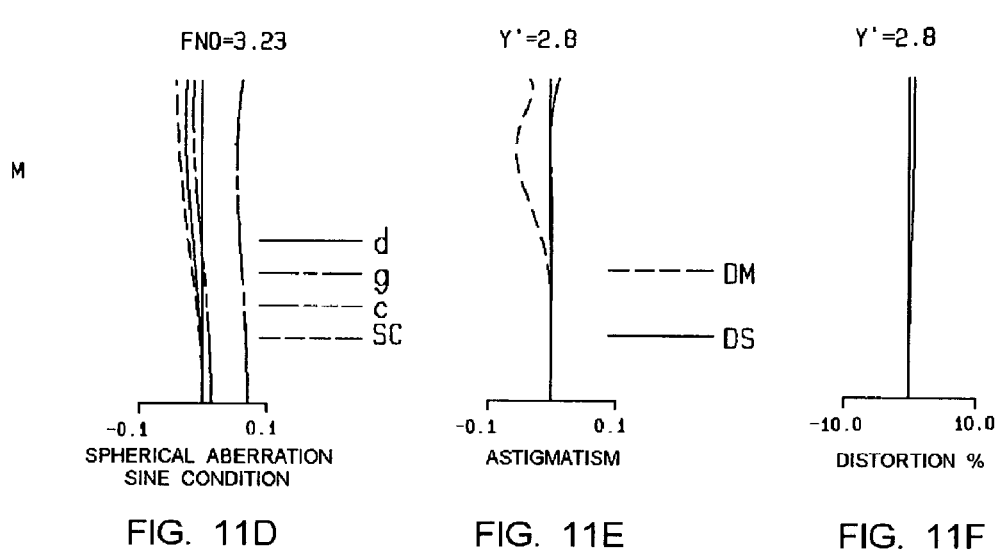
Figures 11G, 11H, 11I:
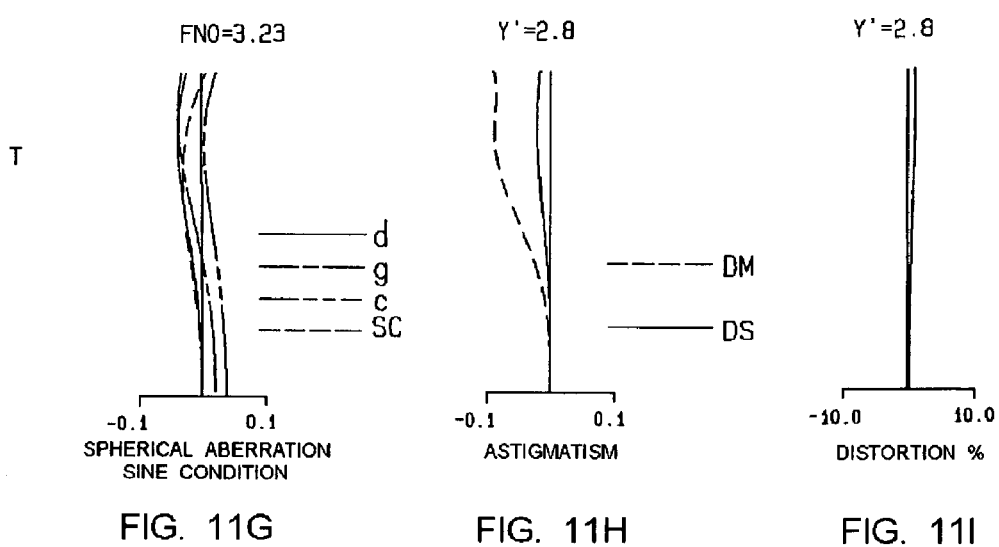
Figures 12A, 12B, 12C:
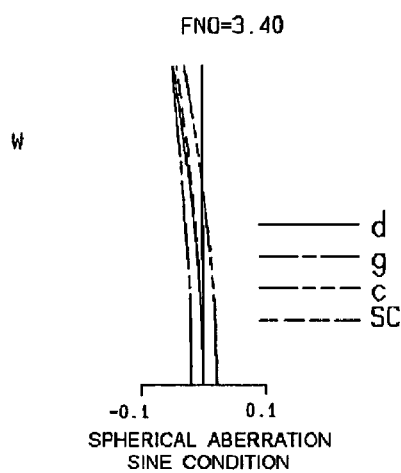
FIGS. 12A to 12I are graphic representations of aberrations in close-up shooting condition (D=0.37 m) of the third embodiment (third example)
Figures 12D, 12E, 12F:
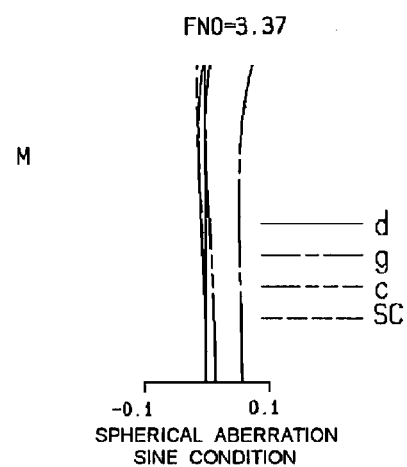
Figures 12G, 12H, 12I:
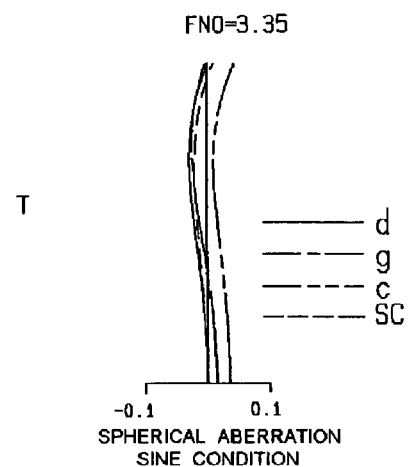

Fourth Embodiment (FIG. 5, Positive, Negative, Positive, Positive, Positive)

The zoom lens system of the fourth embodiment is a five-unit zoom lens system of positive, negative, positive, positive, positive configuration, and the lens units comprise the following elements from the object side: A first lens unit Gri comprises: a negative meniscus lens element concave to the image side; a rectangular prism PR (illustrated as a planeparallel plate in FIG. 5); a bi-convex positive lens element; and a bi-convex positive lens element. A second lens unit Gr2 comprises: a negative lens element having an aspherical surface on each surface; and a doublet lens element consisting of a bi-concave negative lens element and a bi-convex positive lens element. The second lens unit Gr2 is disposed on the second optical axis AX2. A third lens unit Gr3 comprises: an aperture stop SP; a bi-convex positive lens element; and a doublet lens element consisting of a bi-convex positive lens element and a bi-concave negative lens element. The second reflecting surface REF2 of the reflecting mirror RM (illustrated as broken line in FIG. 5) is disposed on the image side of the doublet lens element of the third lens unit Gr3. The third lens unit Gr3 is disposed on the second optical axis AX2. A fourth lens unit Gr4 comprises a negative meniscus lens element convex to the object side and having an aspherical surface on the object side; and a bi-convex positive lens element. The fourth lens unit Gr4 is disposed on the third optical axis AX3. A fifth lens unit Gr5 comprises a positive meniscus lens element convex to the object side and having an aspherical surface on each side.

In the first, the second and the fourth embodiments, during zooming from the wide-angle limit [W] to the telephoto limit [T], the first lens unit Gr1, the third lens unit Gr3 and the fifth lens unit Gr5 are fixed, the second lens unit Gr2 is moved along the second optical axis so as to be always situated on the image side of its position at the wide-angle limit [W], and the fourth lens unit Gr4 is moved toward the object side along the third optical axis and then, makes a U-turn toward the image side.

In the third embodiment, during zooming from the wide-angle limit [W] to the telephoto limit [T], the first lens unit Gr1, the third lens unit Gr3 and the second reflecting surface REF2 are fixed, the second lens unit Gr2 is moved along the second optical axis so as to be always situated on the image side of its position at the wide-angle limit [W], and the fourth lens unit Gr4 is moved toward the object side along the third optical axis and then, makes a U-turn toward the image side.

As described above, in all of the embodiments, zooming is performed by the second lens unit Gr2 moving along the second optical axis AX2 and the fourth lens unit Gr4 moving along the third optical axis AX3. Since the movable units are disposed on different optical axes and the moving mechanisms can be structured independently of each other, a simple and small-size lens barrel structure is enabled.

Moreover, since an inner zoom method is employed such that the first lens unit Gr1 including the first reflecting surface and on which the object light is incident is fixed, the second lens unit Gr2 is moved along the second optical axis and the fourth lens unit Gr4 is moved along the third optical axis, the lens never juts out during zooming, so that shooting can be always performed with the camera being flat.

It is desirable that the zoom lens systems satisfy the conditions shown below. By the conditions being satisfied, a high-magnification zoom lens system excellent in compactness can be realized. It is to be noted that although the corresponding advantageous effect can be attained when each of the conditions shown below is satisfied alone, it is more desirable to satisfy a plurality of conditions when optical performance, size reduction and the like are considered.

It is desirable to satisfy the following condition (1):

$$0.3 < D2/fw < 3 \qquad (1)$$

where

D2 represents the axial distance between the aperture stop and the second reflecting surface, and fw represents the focal length of the zoom lens system at the wide-angle limit.

The condition (1) defines the axial distance between the aperture stop and the second reflecting surface. When the upper limit of the condition (1) is exceeded, the axial distance between the aperture stop and the second reflecting surface is too long, so that the size of the reflecting surface increases. This is undesirable from the viewpoint of size reduction. When the lower limit of the condition (1) is exceeded, the axial distance between the aperture stop and the second reflecting surface is too short, so that it is difficult to bend the optical axis.

It is more desirable to satisfy the following condition (1)'.

$$0.8 < D2/fw < 2.5 \qquad (1)'$$

where
- D2 represents the axial distance between the aperture stop and the second reflecting surface, and
- fw represents the focal length of the zoom lens system at the wide-angle limit.

By the condition (1)', the size of the second reflecting surface can be further reduced and the condition of interference between the aperture stop and the second reflecting surface is relieved. This enables a freer lens arrangement and facilitates aberration correction.

Moreover, it is desirable to satisfy the following condition (2):

$$2 < |fa1/fw| < 8 \quad (2)$$

where
- fa1 represents the focal length of the lens unit situated on the object side of the first reflecting surface, and
- fw represents the focal length at the wide-angle limit.

The condition (2) defines the focal length of the lens unit situated on the object side of the first reflecting surface. When the lower limit of the condition (2) is exceeded, the focal length (absolute value) of the lens unit situated on the object side of the first reflecting surface is too small, so that distortion, particularly negative distortion on the wide-angle side is considerable. Consequently, it is difficult to ensure excellent optical performance. When the upper limit of the condition (2) is exceeded, the focal length (absolute value) of the lens unit situated on the object side of the first reflecting surface is too large. Consequently, the lens elements and the reflecting member of the first lens unit are increased in size. This is undesirable from the viewpoint of size reduction.

It is more desirable to satisfy the following condition (2)'.

$$4 < |fa1/fw| < 6.5 \quad (2)'$$

where
- fa1 represents the focal length of the lens unit situated on the object side of the first reflecting surface, and
- fw represents the focal length at the wide-angle limit.

This enables compatibility between more excellent optical performance and compactness.

Since it is desirable to perform focusing with a lens unit of a minimum weight, it is desirable that the fourth lens unit Gr4 comprising a small number of lens elements and having a small lens diameter be the focusing lens unit.

It is desirable to dispose an aspherical surface in the second lens unit Gr2 like in the above-described embodiments. By disposing an aspherical surface in the second lens unit Gr2, field curvature can be excellently corrected. Moreover, it is desirable to dispose an aspherical surface in the fourth lens unit Gr4 like in the above-described embodiments. By disposing an aspherical surface in the fourth lens unit Gr4, various aberrations such as field curvature and spherical aberration can be excellently corrected. Further, it is desirable to dispose an aspherical surface in the fifth lens unit Gr5. By disposing an aspherical surface in the fifth lens unit Gr5, field curvature can be more excellently corrected.

While the lens units of the first to the fourth embodiments include only refractive lens elements that deflect the incident ray by refraction (that is, lens elements of a type that deflects light at the interface between media having different refractive indices), the present invention is not limited thereto. For example, the lens units may include the following lens elements: diffractive lens elements that deflect the incident ray by diffraction; refraction-diffraction hybrid lens elements that deflect the incident ray by a combination of diffraction and refraction; and gradient index lens elements that deflect the incident ray by the distribution of refractive index in the medium.

While a rectangular prism PR is used as a first reflecting member and a reflecting mirror RM is used as a second reflecting member in the above-described first to fourth embodiments, the reflecting members are not limited thereto. For example, it may be performed to use a reflecting mirror as the first reflecting member and a prism as the second reflecting member, and the reflecting mirror may be either a front surface mirror or a rear surface mirror. The reflecting members may have an optical power on their reflecting surfaces or may be reflective diffraction elements.

While an example of the structure of the optical low pass filter having a planeparallel plate shape and disposed between the last surface of the zoom lens system and the image sensing device is shown in the above-described embodiments, the following are applicable as the low pass filter: a birefringent low pass filter made of, for example, quartz crystal having its predetermined crystallographic axis direction adjusted; and a phase low pass filter that attains a required optical cutoff frequency characteristic by a diffraction effect.

The arrangements of zoom lens systems used for the imaging lens device embodying the present invention will be more concretely described by use of construction data. A first to a fourth example shown below corresponds to the above-described first to fourth embodiments, and the lens arrangement views (FIGS. 2 to 5) showing the first to the fourth embodiments show the lens arrangements of the corresponding first to fourth examples.

Tables 1 to 4 show the construction data of the first to the fourth examples, respectively. In the construction data of the examples, ri (i=1,2,3, . . . ) represents the radius of curvature of the i-th surface counted from the object side, di (i=1,2,3, . . . ) represents the i-th axial distance counted from the object side, and Ni (i=1,2,3, . . . ) and vi (i=1,2,3, . . . ) represent the refractive index (Nd) and the Abbe number (vd) to the d-line of the i-th optical element counted from the object side, respectively. Moreover, in the construction data, the axial distances that vary during zooming are variable air distances at the wide-angle limit (shortest focal length condition) [W], the middle (middle focal length condition) [M] and the telephoto limit (longest focal length condition) [T]. The focal lengths (f) and the F numbers (FNO) of the entire lens system in the focal length conditions [W], [M] and [T] are also shown. Values corresponding to the conditions (1), (1)', (2) and (2)' are shown in Table 5. The movement amount (focus data) of the fourth lens unit Gr4 in focusing in close-up shooting is shown in Table 6. In the first to the third examples, the object distance (from the object point to the image point) D is 0.37 m. In the fourth example, the object distance (from the object point to the image point) D is 0.67 m.

The surfaces represented by a radius of curvature ri marked with an asterisk are aspherical surfaces, and are defined by the expression (AS) shown below expressing the surface configuration of an aspherical surface. Aspherical surface data of the aspherical surfaces are shown as well as other data.

$$X(H) = (C \cdot H^2)/\{1 + \sqrt{(1 - \epsilon \cdot C^2 \cdot H^2)}\} + (A4 \cdot H^4 + A6 \cdot H^6 + A8 \cdot H^8) \quad (AS)$$

where
- X(H) represents the displacement along the optical axis at a height H (relative to the vertex), H represents the height in a direction perpendicular to the optical axis, C represents the paraxial curvature, $\epsilon$ represents the quadric surface parameter, and Ai represents the i-th-order aspherical surface coefficient.

FIGS. 6A to 6I, 7A to 7I, 8A to 8I and 9A to 9I are graphic representations of aberrations in infinity shooting condition corresponding to the first to the fourth examples. FIGS. 10A to 10I, 11A to 11I, 12A to 12I and 13A to 13I are graphic representations of aberrations in close-up shooting condition corresponding to the first to the fourth examples. In the first to the third examples, the object distance (from the object point to the image point) D is 0.37 m. In the fourth example, the object distance (from the object point to the image point) D is 0.67 m. Of these figures, FIGS. 6A to 6C, 7A to 7C, 8A to 8C, 9A to 9C, 10A to 10C, 11A to 11C, 12A to 12C and 13A to 13C are graphic representations of aberrations at the wide-angle limit [W], FIGS. 6D to 6F, 7D to 7F, 8D to 8F, 9D to 9F, 10D to 11F, 11D to 11F, 12D to 12F and 13D to 13F are graphic representations of aberrations at the middle [M], and FIGS. 6G to 6I, 7G to 7I, 8G to 8I, 9G to 9I, 10G to 10I, 11G to 11I, 12G to 12I and 13G to 13I are graphic representations of aberrations at the telephoto limit [T]. Of these figures, FIGS. 6A, 6D, 6G, 7A, 7D, 7G, 8A, 8D, 8G, 9A, 9D, 9G, 10A, 10D, 10G, 11A, 11D, 11G, 12A, 12D, 12G, 13A, 13D and 13G show spherical aberration and sine condition, FIGS. 6B, 6E, 6H, 7B, 7E, 7H, 8B, 8E, 8H, 9B, 9E, 9H, 10B, 10E, 10H, 11B, 11E, 11H, 12B, 12E, 12H, 13B, 13E and 13H show astigmatism, and FIGS. 6C, 6F, 6I, 7C, 7F, 7I, 8C, 8F, 8I, 9C, 9F, 9I, 10C, 10F, 10I, 11C, 11F, 11I, 12C, 12F, 12I, 13C, 13F and 13I show distortion. In the graphic representations of aberrations, Y' represents the maximum image height. In the graphic representations of spherical aberration, the solid line (d) represents spherical aberration to the d-line, the chain line (g) represents spherical aberration to the g-line, the chain double-dashed line (c) represents spherical aberration to the c-line, and the broken line (SC) represents sine condition. In the graphic representations of astigmatism, the broken line (DM) represents astigmatism to the d-line on the meridional image plane, and the solid line (DS) represents astigmatism to the d-line on the sagittal image plane. In the graphic representations of distortion, the solid line represents distortion % to the d-line.

The configuration of the digital camera 1 corresponding to the imaging lens device of each of the first to the fourth embodiments is similar to that shown in FIG. 1, and there is no difference other than in the imaging lens device.

As described above, according to the imaging lens devices of the above-described first to fourth embodiments, an imaging lens device can be realized attaining size reduction and zoom magnification increase of the zoom lens system while satisfying high image quality. Particularly, according to the imaging lens device of the above-described embodiments, since the incident optical axis is bent approximately 90° by the first reflecting surface and the optical axis bent by the first reflecting surface is further bent approximately 90° by the second reflecting surface, a very compact imaging lens device can be realized.

Moreover, in the imaging lens devices of the above-described embodiments, since during zooming, the first reflecting surface, the aperture stop and the second reflecting surface are fixed and the first movable lens unit disposed between the first reflecting surface and the second reflecting surface and the second movable lens unit disposed on the image side of the second reflecting surface are moved, the lens barrel structure can be simplified, so that size reduction and cost reduction are enabled. Moreover, since the inner zoom method is employed, the lens never juts out during zooming.

Further, by using any of the above-described imaging lens devices to digital cameras, video cameras and cameras incorporated in or externally attached to electronic apparatuses (for example, personal computers, mobile computers, portable telephones, and PDAs), size reduction (thickness reduction), zoom magnification increase and image quality improvement of these apparatuses can be attained.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

TABLE 1

1st Embodiment (Example 1)
f = 5.00~15.00~24.00, FNO = 3.40~3.25~3.26

| Radius of Curvature | Axial Distance | Refractive Index | Abbe Number |
|---|---|---|---|
| r1 = 118.726 | d1 = 0.85 | N1 = 1.84666 | v1 = 23.82 |
| r2 = 15.576 | d2 = 2.058 | | |
| r3 = ∞ | d3 = 11.50 | N2 = 1.84666 | v2 = 23.78 |
| r4 = ∞ | d4 = 0.10 | | |
| r5 = 33.443 | d5 = 3.00 | N3 = 1.62041 | v3 = 60.29 |
| r6 = −27.845 | d6 = 0.10 | | |
| r7 = 19.290 | d7 = 2.50 | N4 = 1.63854 | v4 = 55.62 |
| r8 = 569.934 | d8 = 0.74~10.098~12.849 | | |
| r9* = −72.357 | d9 = 0.80 | N5 = 1.52200 | v5 = 52.2 |
| r10* = 6.402 | d10 = 2.055 | | |
| r11 = −5.258 | d11 = 0.75 | N6 = 1.75450 | v6 = 51.57 |
| r12 = 29.887 | d12 = 1.71 | N7 = 1.84666 | v7 = 23.82 |
| r13 = −13.462 | d13 = 13.079~3.722~0.970 | | |
| r14 = ∞(SP) | d14 = 0.43 | | |
| r15 = 15.966 | d15 = 1.50 | N8 = 1.80610 | v8 = 40.72 |
| r16 = −172.905 | d16 = 6.573 | | |
| r17 = 12.407 | d17 = 2.904 | N9 = 1.48749 | v9 = 70.44 |
| r18 = −8.734 | d18 = 0.85 | N10 = 1.84666 | v10 = 23.82 |
| r19 = −60.848 | d19 = 5.906~2.05~3.216 | | |
| r20* = 7.586 | d20 = 0.95 | N11 = 1.84506 | v11 = 23.66 |
| r21 = 5.428 | d21 = 1.00 | | |
| r22 = 6.987 | d22 = 2.60 | N12 = 1.53172 | v12 = 48.84 |
| r23 = −39.112 | d23 = 3.525~7.381~6.215 | | |
| r24* = −24.125 | d24 = 1.50 | N13 = 1.52510 | v13 = 56.38 |
| r25* = −49.443 | d25 = 0.629 | | |
| r26 = ∞ | d26 = 1.30 | N14 = 1.51680 | v14 = 64.20 |
| r27 = ∞ | d27 = 0.60 | | |
| r28 = ∞ | d28 = 0.70 | N15 = 1.51680 | v15 = 64.20 |
| r29 = ∞ | | | |

Aspherical Surface Data of the 9th Surface (r9)

$\epsilon$ = 1.00000
A4 = 0.13728318 × $10^{-2}$    A6 = −0.13493699 × $10^{-4}$
A8 = 0.47509623 × $10^{-6}$ Aspherical Surface Data of the 10th Surface (r10)

$\epsilon$ = 1.00000
A4 = 0.11265340 × $10^{-2}$    A6 = 0.15685648 × $10^{-4}$
A8 = 0.40463823 × $10^{-5}$ Aspherical Surface Data of the 20th Surface (r20)

$\epsilon = 1.00000$
$A4 = 0.48807721 \times 10^{-4}$    $A6 = 0.14566395 \times 10^{-5}$
$A8 = 0.20689300 \times 10^{-6}$ Aspherical Surface Data of the 24th Surface (r24)

$\epsilon = 1.00000$
$A4 = -0.96805708 \times 10^{-3}$    $A6 = 0.17138459 \times 10^{-3}$
$A8 = -0.13824254 \times 10^{-4}$ Aspherical Surface Data of the 25th Surface (r25)

$\epsilon = 1.00000$
$A4 = -0.59943279 \times 10^{-3}$    $A6 = 0.18792404 \times 10^{-3}$
$A8 = -0.16040459 \times 10^{-4}$

TABLE 2

2nd Embodiment (Example 2)
$f = 5.00\sim15.00\sim24.00$, $FNO = 3.40\sim3.24\sim3.24$

| Radius of Curvature | Axial Distance | Refractive Index | Abbe Number |
|---|---|---|---|
| r1 = 133.325 | d1 = 0.85 | N1 = 1.84666 | ν1 = 23.82 |
| r2 = 15.888 | d2 = 2.025 | | |
| r3 = ∞ | d3 = 11.6 | N2 = 1.84666 | ν2 = 23.82 |
| r4 = ∞ | d4 = 0.10 | | |
| r5 = 35.391 | d5 = 3.035 | N3 = 1.63854 | ν3 = 55.62 |
| r6 = −26.543 | d6 = 0.10 | | |
| r7 = 16.974 | d7 = 2.515 | N4 = 1.58913 | ν4 = 61.11 |
| r8 = 151.530 | d8 = 0.740~10.019~12.717 | | |
| r9* = −38.770 | d9 = 0.80 | N5 = 1.52200 | ν5 = 52.20 |
| r10* = 6.550 | d10 = 2.062 | | |
| r11 = −4.749 | d11 = 0.75 | N6 = 1.75450 | ν6 = 51.57 |
| r12 = 73.988 | d12 = 1.71 | N7 = 1.84666 | ν7 = 23.82 |
| r13 = −11.055 | d13 = 12.947~3.669~0.970 | | |
| r14 = ∞ (SP) | d14 = 0.43 | | |
| r15 = 16.559 | d15 = 1.509 | N8 = 1.78831 | ν8 = 47.32 |
| r16 = −74.508 | d16 = 6.564 | | |
| r17 = 12.712 | d17 = 2.956 | N9 = 1.48749 | ν9 = 70.44 |
| r18 = −8.644 | d18 = 0.85 | N10 = 1.84666 | ν10 = 23.82 |
| r19 = −45.947 | d19 = 7.220~2.057~3.601 | | |
| r20* = 7.626 | d20 = 0.95 | N11 = 1.84506 | ν11 = 23.66 |
| r21 = 5.238 | d21 = 1.00 | | |
| r22 = 6.734 | d22 = 2.366 | N12 = 1.58267 | ν12 = 46.43 |
| r23 = 185.136 | d23 = 2.047~7.210~5.665 | | |
| r24* = −23.000 | d24 = 2.00 | N13 = 1.52510 | ν13 = 56.38 |
| r25* = −16.473 | d25 = 0.45 | | |
| r26 = ∞ | d26 = 1.30 | N14 = 1.51680 | ν14 = 64.20 |
| r27 = ∞ | d27 = 0.60 | | |
| r28 = ∞ | d28 = 0.70 | N15 = 1.51680 | ν15 = 64.20 |
| r29 = ∞ | | | |

Aspherical Surface Data of the 9th Surface (r9)

$\epsilon = 1.00000$
$A4 = 0.18640680 \times 10^{-2}$    $A6 = -0.41315515 \times 10^{-4}$
$A8 = 0.15957856 \times 10^{-5}$ Aspherical Surface Data of the 10th Surface (r10)

$\epsilon = 1.00000$
$A4 = 0.15462609 \times 10^{-2}$    $A6 = -0.10995458 \times 10^{-4}$
$A8 = 0.54077447 \times 10^{-5}$ Aspherical Surface Data of the 20th Surface (r20)

$\epsilon = 1.00000$
$A4 = 0.91946129 \times 10^{-4}$    $A6 = 0.23183290 \times 10^{-5}$
$A8 = 0.23697079 \times 10^{-6}$ Aspherical Surface Data of the 24th Surface (r24)

$\epsilon = 1.00000$
$A4 = -0.84583166 \times 10^{-3}$    $A6 = 0.75642550 \times 10^{-4}$
$A8 = -0.76037481 \times 10^{-5}$ Aspherical Surface Data of the 25th Surface (r25)

$\epsilon = 1.00000$
$A4 = -0.30595350 \times 10^{-3}$    $A6 = 0.55919456 \times 10^{-4}$
$A8 = -0.67864381 \times 10^{-5}$

TABLE 3

3rd Embodiment (Example 3)
$f = 5.00\sim15.00\sim24.00$, $FNO = 3.40\sim3.24\sim3.24$

| Radius of Curvature | Axial Distance | Refractive Index | Abbe Number |
|---|---|---|---|
| r1 = 88.454 | d1 = 0.85 | N1 = 1.84666 | ν1 = 23.82 |
| r2 = 14.917 | d2 = 2.188 | | |
| r3 = ∞ | d3 = 11.60 | N2 = 1.84666 | ν2 = 23.78 |
| r4 = ∞ | d4 = 0.10 | | |
| r5 = 32.241 | d5 = 3.208 | N3 = 1.62280 | ν3 = 56.88 |
| r6 = −25.250 | d6 = 0.10 | | |
| r7 = 18.784 | d7 = 2.40 | N4 = 1.58913 | ν4 = 61.11 |
| r8 = 164.159 | d8 = 0.740~10.218~13.125 | | |
| r9* = −28.564 | d9 = 0.80 | N5 = 1.52200 | ν5 = 52.20 |
| r10* = 7.627 | d10 = 2.166 | | |
| r11 = −4.799 | d11 = 0.75 | N6 = 1.75450 | ν6 = 51.57 |
| r12 = −335.530 | d12 = 1.71 | N7 = 1.84666 | ν7 = 23.82 |
| r13 = −10.446 | d13 = 13.355~3.877~0.970 | | |
| r14 = ∞ (SP) | d14 = 0.43 | | |
| r15 = 14.447 | d15 = 1.52 | N8 = 1.83400 | ν8 = 37.34 |
| r16 = 756.167 | d16 = 6.581 | | |
| r17 = 11.270 | d17 = 2.841 | N9 = 1.48749 | ν9 = 70.44 |
| r18 = −9.120 | d18 = 0.85 | N10 = 1.84666 | ν10 = 23.82 |
| r19 = 55.732 | d19 = 5.119~2.050~3.574 | | |
| r20* = 8.963 | d20 = 0.95 | N11 = 1.84506 | ν11 = 23.66 |
| r21 = 6.451 | d21 = 0.943 | | |
| r22 = 8.132 | d22 = 3.188 | N12 = 1.54072 | ν12 = 47.20 |
| r23 = −16.953 | d23 = 4.994~8.062~6.539 | | |
| r24* = ∞ | d24 = 1.30 | N13 = 1.51680 | ν13 = 64.20 |
| r25* = ∞ | d25 = 0.60 | | |
| r26 = ∞ | d26 = 0.70 | N14 = 1.51680 | ν14 = 64.20 |
| r27 = ∞ | | | |

Aspherical Surface Data of the 9th Surface (r9)

$\epsilon = 1.00000$
$A4 = 0.20471287 \times 10^{-2}$    $A6 = -0.52314206 \times 10^{-4}$
$A8 = 0.18678759 \times 10^{-5}$ Aspherical Surface Data of the 10th Surface (r10)

$\epsilon = 1.00000$
$A4 = 0.16370282 \times 10^{-2}$    $A6 = -0.77909254 \times 10^{-5}$
$A8 = 0.32476408 \times 10^{-5}$ Aspherical Surface Data of the 20th Surface (r20)

$\epsilon = 1.00000$
$A4 = -0.10543001 \times 10^{-3}$    $A6 = 0.28497046 \times 10^{-5}$
$A8 = -0.17276234 \times 10^{-8}$

TABLE 4

4th Embodiment (Example 4)
f = 5.00~15.01~24.00, FNO = 3.40~3.23~3.22

| Radius of Curvature | Axial Distance | Refractive Index | Abbe Number |
|---|---|---|---|
| r1 = 49.826 | d1 = 0.85 | N1 = 1.84666 | ν1 = 23.82 |
| r2 = 16.789 | d2 = 2.431 | | |
| r3 = ∞ | d3 = 12.20 | N2 = 1.84666 | ν2 = 23.78 |
| r4 = ∞ | d4 = 0.10 | | |
| r5 = 41.363 | d5 = 2.437 | N3 = 1.69100 | ν3 = 54.75 |
| r6 = −51.928 | d6 = 0.10 | | |
| r7 = 21.081 | d7 = 2.948 | N4 = 1.51680 | ν4 = 64.20 |
| r8 = −68.150 | d8 = 0.740~11.309~14.348 | | |
| r9* = −20.505 | d9 = 0.80 | N5 = 1.52200 | ν5 = 52.20 |
| r10* = 7.013 | d10 = 2.128 | | |
| r11 = −5.877 | d11 = 0.75 | N6 = 1.75450 | ν6 = 51.57 |
| r12 = 37.049 | d12 = 2.35 | N7 = 1.84666 | ν7 = 23.82 |
| r13 = −13.312 | d13 = 15.246~4.677~1.638 | | |
| r14 = ∞ (SP) | d14 = 0.45 | | |
| r16 = 23.499 | d15 = 2.102 | N8 = 1.75690 | ν8 = 29.69 |
| r16 = −32.127 | d16 = 0.85 | | |
| r17 = 24.860 | d17 = 3.25 | N9 = 1.69100 | ν9 = 54.75 |
| r18 = −9.756 | d18 = 0.85 | N10 = 1.84666 | ν10 = 23.82 |
| r19 = 78.407 | d19 = 13.270~8.215~8.900 | | |
| r20* = 8.311 | d20 = 0.95 | N11 = 1.84506 | ν11 = 23.66 |
| r21 = 5.915 | d21 = 0.868 | | |
| r22 = 7.193 | d22 = 2.993 | N12 = 1.48749 | ν12 = 70.44 |
| r23 = −28.312 | d23 = 1.495~6.550~5.865 | | |
| r24* = 8.798 | d24 = 1.54 | N13 = 1.52510 | ν13 = 56.38 |
| r25* = 8.572 | d25 = 1.884 | | |
| r26 = ∞ | d26 = 1.30 | N14 = 1.51680 | ν14 = 64.20 |
| r27 = ∞ | d27 = 0.60 | | |
| r28 = ∞ | d28 = 0.70 | N15 = 1.51680 | ν15 = 64.20 |
| r29 = ∞ | | | |

Aspherical Surface Data of the 9th Surface (r9)

$\epsilon = 1.00000$
$A4 = 0.14751216 \times 10^{-2}$    $A6 = -0.38769554 \times 10^{-4}$
$A8 = 0.64244535 \times 10^{-6}$ Aspherical Surface Data of the 10th Surface (r10)

$\epsilon = 1.00000$
$A4 = 0.11487033 \times 10^{-2}$    $A6 = -0.32301579 \times 10^{-6}$
$A8 = 0.68660388 \times 10^{-6}$ Aspherical Surface Data of the 20th Surface (r20)

$\epsilon = 1.00000$
$A4 = 0.10913755 \times 10^{-4}$    $A6 = 0.34527941 \times 10^{-5}$
$A8 = 0.13104048 \times 10^{-7}$ Aspherical Surface Data of the 24th Surface (r24)

$\epsilon = 1.00000$
$A4 = 0.90878003 \times 10^{-3}$    $A6 = -0.14873572 \times 10^{-3}$
$A8 = 0.14919137 \times 10^{-5}$ Aspherical Surface Data of the 25th Surface (r25)

$\epsilon = 1.00000$
$A4 = 0.20691458 \times 10^{-2}$    $A6 = -0.33227828 \times 10^{-3}$
$A8 = 0.67156628 \times 10^{-5}$

TABLE 5

Actual Values of Conditional Formulae

| | (1), (1)' D2/fw | (2), (2)' |fa1/fw| |
|---|---|---|
| Example 1 | 1.063 | 4.251 |
| Example 2 | 1.058 | 4.275 |
| Example 3 | 1.073 | 4.261 |
| Example 4 | 2.340 | 6.053 |

TABLE 6

Focusing data
Focusing Unit: Fourth Lens Unit (Gr4)
Movement Direction: Toward the Object
Shooting Distance (from Object Point to Image Plane):
Example 1~3 D = 0.37(m), Example 4 D = 0.67(m)
Movement Distance of Focusing Unit (mm)

| | W | M | T |
|---|---|---|---|
| Example 1 | 0.096 | 0.668 | 1.692 |
| Example 2 | 0.136 | 0.840 | 2.158 |
| Example 3 | 0.087 | 0.700 | 1.753 |
| Example 4 | 0.065 | 0.446 | 1.130 |

What is claimed is:
1. An imaging lens device comprising:
a zoom lens system for forming an optical image; and
an image sensing device for converting the optical image formed by the zoom lens system into electrical signals,
wherein the zoom lens system comprises from an object side thereof to an image side thereof:
a first reflecting surface to bend a first optical axis which is an incident optical axis of the zoom lens system into a second optical axis at an angle of approximately 90 degrees, and stationary during zooming;

a first movable lens unit disposed on the second optical axis, and moving during zooming;

a second reflecting surface to bend the second optical axis into a third optical axis, and stationary during zooming; and a second movable lens unit disposed on the third optical axis, and moving during zooming, wherein a plane formed by the second optical axis and the third optical axis is approximately perpendicular to the first optical axis.

2. An imaging lens device as claimed in claim 1, wherein the first movable lens unit has a negative optical power and the second movable lens unit has a positive optical power.

3. An imaging lens device as claimed in claim 1, wherein the first reflecting surface is included in a lens unit having a positive optical power as a whole; and the second reflecting surface is included in another lens unit having a positive optical power as a whole.

4. An imaging lens device as claimed in claim 1, wherein the zoom lens system comprises sequentially from an object side thereof to an image side thereof:

a first lens unit having a positive optical power, and including the first reflecting surface;

a second lens unit having a negative optical power, and moving during zooming;

a third lens unit having a positive optical power, and including the second reflecting surface; and a fourth lens unit having a positive optical power, and moving during zooming.

5. An imaging lens device as claimed in claim 4, wherein the zoom lens system further comprises a fifth lens unit disposed on the image side of the fourth lens unit, having a positive power.

6. An imaging lens device as claimed in claim 1, wherein the first optical axis, the second optical axis and the third optical axis are approximately perpendicular to each other.

7. An imaging lens device as claimed in claim 1, wherein focusing is achieved by moving the second movable lens unit.

8. An imaging lens device comprising:

a zoom lens system for forming an optical image; and an image sensing device for converting the optical image formed by the zoom lens system into electrical signals, wherein the zoom lens system comprises from an object side thereof to an image side thereof:

a first reflecting surface to bend a first optical axis which is an incident optical axis of the zoom lens system into a second optical axis at an angle of approximately 90 degrees, and stationary during zooming;

an aperture stop disposed on the second optical axis, and stationary during zooming; and a second reflecting surface to bend the second optical axis into a third optical axis, and stationary during zooming, wherein a plane formed by the second optical axis and the third optical axis is approximately perpendicular to the first optical axis; and wherein the following conditional formula is satisfied:

$0.3 < D2/fw < 3$ where

D2 represents an axial distance between the aperture stop and the second reflecting surface; and fw represents a focal length of the entirety of the zoom lens system at a wide angle limit.

9. An imaging lens device as claimed in claim 8, wherein the zoom lens system further comprises:

a first movable lens unit disposed on the second optical axis and moving during zooming;

a second movable lens unit disposed on the third optical axis and moving during zooming.

10. An imaging lens device as claimed in claim 9, wherein the first movable lens unit has a negative optical power and the second movable lens unit has a positive optical power.

11. An imaging lens device as claimed in claim 10, wherein the zoom lens system further comprises:

a lens unit having a positive optical power and including the first reflecting surface; and another lens unit having a positive optical power and including the second reflecting surface.

12. An imaging lens device as claimed in claim 9, wherein focusing is achieved by moving the second movable lens unit.

13. An imaging lens device as claimed in claim 8, wherein the zoom lens system comprises sequentially from an object side thereof to an image side thereof:

a first lens unit having a positive optical power as a whole and including the first reflecting surface, and stationary during zooming;

a second lens unit, disposed on the second optical axis, having a negative optical power and moving during zooming;

the aperture stop disposed on the second optical axis;

a third lens unit having a positive optical power as a whole and including the second reflecting surface, and stationary during zooming;

a fourth lens unit, disposed on the third optical axis, having a positive optical power and moving during zooming.

14. An imaging lens device as claimed in claim 13, wherein the zoom lens system further comprises a fifth lens unit disposed on the image side of the fourth lens unit, having a positive power.

15. An imaging lens device as claimed in claim 8, wherein the following conditional formula is additionally satisfied:

$2 < |fa1/fw| < 8$ where fa1 represents a focal length of a lens unit disposed on the object side of the first reflecting surface; and fw represents a focal length of the entirety of the zoom lens system at a wide angle limit.

16. An imaging lens device as claimed in claim 8, wherein the first optical axis and a plane formed of the second optical axis and the third optical axis are approximately perpendicular to each other.

17. An imaging lens device as claimed in claim 16, wherein the first optical axis, the second optical axis and the third optical axis are approximately perpendicular to each other.

18. A digital camera comprising an imaging lens device, wherein the imaging lens device comprises:

a zoom lens system for forming an optical image; and an image sensing device for converting the optical image formed by the zoom lens system into electrical signals, wherein the zoom lens system comprises from an object side thereof to an image side thereof:

a first reflecting surface to bend a first optical axis which is an incident optical axis of the zoom lens system into a second optical axis at an angle of approximately 90 degrees, and stationary during zooming;

a first movable lens unit disposed on the second optical axis, and moving during zooming;

a second reflecting surface to bend the second optical axis into a third optical axis, and stationary during zooming; and a second movable lens unit disposed on the third optical axis, and moving during zooming, wherein a plane formed by the second optical axis and the third optical axis is approximately perpendicular to the first optical axis.

19. A digital camera as claimed in claim 18, wherein the first movable lens unit has a negative optical power and the second movable lens unit has a positive optical power.

20. A digital camera as claimed in claim 19, wherein the first reflecting surface is included in a lens unit having a positive optical power as a whole; and the second reflecting surface is included in another lens unit having a positive optical power as a whole.

21. A digital camera as claimed in claim 18, wherein the first optical axis, a second optical axis and a third optical axis are approximately perpendicular to each other.

22. A digital camera as claimed in claim 18, wherein focusing is achieved by moving the second movable lens unit.

23. An imaging lens device as claimed in claim 18, wherein the zoom lens system comprises sequentially from an object side thereof to an image side thereof:

a first lens unit having a positive optical power, and including the first reflecting surface;

a second lens unit having a negative optical power, and moving during zooming;

a third lens unit having a positive optical power, and including the second reflecting surface; and a fourth lens unit having a positive optical power, and moving during zooming.

24. An imaging lens device as claimed in claim 23, wherein the zoom lens system further comprises a fifth lens unit disposed on the image side of the fourth lens unit, having a positive power.

25. A digital camera comprising an imaging lens device, wherein the imaging lens device comprises:

a zoom lens system for forming an optical image; and an image sensing device for converting the optical image formed by the zoom lens system into electrical signals, wherein the zoom lens system comprises from an object side thereof to an image side thereof:

a first reflecting surface to bend a first optical axis which is an incident optical axis of the zoom lens system into a second optical axis at an angle of approximately 90 degrees, and stationary during zooming;

an aperture stop disposed on the second optical axis, and stationary during zooming; and a second reflecting surface to bend the second optical axis into a third optical axis, and stationary during zooming, wherein a plane formed by the second optical axis and the third optical axis is approximately perpendicular to the first optical axis; and wherein the following conditional formula is satisfied:

$$0.3 < D2/fw < 3$$

where

D2 represents an axial distance between the aperture stop and the second reflecting surface; and fw represents a focal length of the entirety of the zoom lens system at a wide angle limit.

26. A digital camera claimed in claim 25, wherein the zoom lens system further comprises:

a first movable lens unit disposed on the second optical axis and moving during zooming;

a second movable lens unit disposed on the third optical axis and moving during zooming.

27. A digital camera claimed in claim 26, wherein the first movable lens unit has a negative optical power and the second movable lens unit has a positive optical power.

28. A digital camera claimed in claim 27, wherein the zoom lens system further comprises:

a lens unit having a positive optical power and including the first reflecting surface; and another lens unit having a positive optical power and including the second reflecting surface.

29. A digital camera as claimed in claim 26, wherein focusing is achieved by moving the second movable lens unit.

30. A digital camera as claimed in claim 25, wherein the first optical axis, the second optical axis and the third optical axis are approximately perpendicular to each other.

31. A digital camera as claimed in claim 25, wherein the zoom lens system comprises sequentially from an object side thereof to an image side thereof:

a first lens unit having a positive optical power as a whole and including the first reflecting surface, and stationary during zooming;

a second lens unit, disposed on the second optical axis, having a negative optical power and moving during zooming;

the aperture stop disposed on the second optical axis and stationary during zooming;

a third lens unit having a positive optical power as a whole and including the second reflecting surface, and stationary during zooming; and a fourth lens unit, disposed on the third, optical axis, having a positive optical power and moving during zooming.

32. A digital camera as claimed in claim 31, wherein the zoom lens system further comprises a fifth lens unit disposed on the image side of the fourth lens unit, having a positive power.

* * * * *